United States Patent
Russell et al.

(10) Patent No.: US 11,997,592 B2
(45) Date of Patent: *May 28, 2024

(54) PLMN SELECTION FOR MISSION CRITICAL DEVICES

(71) Applicant: Malikie Innovations Limited, Dublin (IE)

(72) Inventors: Nicholas James Russell, Newbury (GB); Adrian Buckley, Tracy, CA (US); Jan Hendrik Lucas Bakker, Fort Worth, TX (US)

(73) Assignee: Malikie Innovations Limited, Dublin (IE)

( * ) Notice: Subject to any disclaimer, the term of this patent is extended or adjusted under 35 U.S.C. 154(b) by 264 days.

This patent is subject to a terminal disclaimer.

(21) Appl. No.: 17/527,061

(22) Filed: Nov. 15, 2021

(65) Prior Publication Data

US 2022/0104116 A1    Mar. 31, 2022

Related U.S. Application Data

(63) Continuation of application No. 15/816,607, filed on Nov. 17, 2017, now Pat. No. 11,202,253.

(51) Int. Cl.
*H04W 48/18* (2009.01)
*H04L 61/3015* (2022.01)
(Continued)

(52) U.S. Cl.
CPC ......... *H04W 48/18* (2013.01); *H04L 61/3015* (2013.01); *H04L 65/1016* (2013.01);
(Continued)

(58) Field of Classification Search
CPC ..... H04W 72/042; H04W 4/10; H04W 88/04; H04W 48/16; H04W 76/10; H04W 88/02; H04W 84/042
See application file for complete search history.

(56) References Cited

U.S. PATENT DOCUMENTS 11,202,253 B2    12/2021   Russell et al.
2003/0045290 A1   3/2003   Tuchimesta et al.
(Continued)

FOREIGN PATENT DOCUMENTS

CN    102474523 A    5/2012
CN    105493467 A    4/2016
(Continued)

OTHER PUBLICATIONS

Chinese Office Action; Application No. 201880084703.3; dated Nov. 22, 2022; 23 pages.
(Continued)

*Primary Examiner* — Khaled M Kassim
*Assistant Examiner* — Najeeb Ansari
(74) *Attorney, Agent, or Firm* — Conley Rose, P.C.; J. Robert Brown, Jr.

(57) ABSTRACT

A method for selecting a Public Land Mobile Network (PLMN) at a user equipment (UE), comprising receiving, from a network entity, a list of PLMN identifiers, attempting to register the UE with a network using at least one PLMN identifier from the list of PLMN identifiers, and if the attempt to register with the network is successful, performing a Session Initiation Protocol (SIP) registration to an Internet Protocol (IP) Multimedia Sub-system (IMS) associated to the PLMN identifier.

8 Claims, 13 Drawing Sheets

(51) Int. Cl.
| | |
|---|---|
| *H04L 65/1016* | (2022.01) |
| *H04L 65/1073* | (2022.01) |
| *H04L 65/1104* | (2022.01) |
| *H04L 101/30* | (2022.01) |
| *H04W 60/00* | (2009.01) |
| *H04W 60/04* | (2009.01) |

(52) U.S. Cl.
CPC ......... *H04L 65/1073* (2013.01); *H04W 60/00* (2013.01); *H04W 60/005* (2013.01); *H04L 65/1104* (2022.05); *H04L 2101/30* (2022.05); *H04W 60/04* (2013.01)

(56) References Cited

U.S. PATENT DOCUMENTS

| | | |
|---|---|---|
| 2013/0310088 A1 | 11/2013 | Wong et al. |
| 2014/0177506 A1 | 6/2014 | Korus |
| 2017/0005914 A1 | 1/2017 | Edge et al. |
| 2017/0041752 A1 | 2/2017 | Baek |
| 2017/0055171 A1 | 2/2017 | Keskitalo |
| 2017/0134444 A1 | 5/2017 | Buckley et al. |
| 2017/0238359 A1 | 8/2017 | Atarius |
| 2017/0245316 A1 | 8/2017 | Salkintzis |
| 2017/0251029 A1 | 8/2017 | Atarius |
| 2017/0257751 A1 | 9/2017 | Atarius |
| 2017/0288886 A1 | 10/2017 | Atarius |
| 2017/0332416 A1 | 11/2017 | Kiss et al. |
| 2017/0374109 A1* | 12/2017 | Atarius ............... H04L 65/1104 |
| 2018/0041857 A1 | 2/2018 | Ouchi |
| 2018/0092016 A1* | 3/2018 | Kim ..................... H04W 60/04 |
| 2018/0110054 A1 | 4/2018 | Jung |
| 2018/0234465 A1 | 8/2018 | Kim |
| 2019/0028941 A1 | 1/2019 | Zee |
| 2019/0029058 A1 | 1/2019 | Russell |
| 2019/0044639 A1 | 2/2019 | Ouchi |
| 2019/0044980 A1 | 2/2019 | Russell |

FOREIGN PATENT DOCUMENTS

| | | |
|---|---|---|
| CN | 107211342 A | 9/2017 |
| EP | 3193542 A1 | 7/2017 |
| KR | 20110091305 A | 8/2011 |
| WO | 2017034195 A1 | 3/2017 |

OTHER PUBLICATIONS

Office Action dated Dec. 3, 2018; U.S. Appl. No. 15/816,607, filed Nov. 17, 2017; 20 pages.
Final Office Action dated Jun. 28, 2019; U.S. Appl. No. 15/816,607, filed Nov. 17, 2017; 20 pages.
Advisory Action dated Sep. 17, 2019; U.S. Appl. No. 15/816,607, filed Nov. 17, 2017; 8 pages.
Office Action dated Jan. 8, 2020; U.S. Appl. No. 15/816,607, filed Nov. 17, 2017; 17 pages.
Office Action dated Jun. 29, 2020; U.S. Appl. No. 15/816,607, filed Nov. 17, 2017; 16 pages.
Final Office Action dated Oct. 19, 2020; U.S. Appl. No. 15/816,607, filed Nov. 17, 2017; 17 pages.
Advisory Action dated Jan. 19, 2021; U.S. Appl. No. 15/816,607, filed Nov. 17, 2017; 5 pages.
Notice of Allowance dated Aug. 11, 2021; U.S. Appl. No. 15/816,607, filed Nov. 17, 2017; 12 pages.
3GPP TR 23.781 V15.0.0; 3rd Generation Partnership Project; Technical Specification Group Services and System Aspects; Study on Migration and Interconnection for Mission Critical Services; Release 15; Jun. 2017; 66 pages.
Korean Office Action; Application No. 10-2020-7016819; dated Jul. 20, 2023; 13 pages.
3GPP TS 22.011 V14.7.0; 3rd Generation Partnership Project; Technical Specification Group Services and System Aspects; Service Accessibility; Release 14; Sep. 2017; 31 pages.
3GPP TS 22.280 V15.1.0; 3rd Generation Partnership Project; Technical Specification Group Services and System Aspects; Mission Critical Services Common Requirements (MCCoRe); Stage 1; Release 15; Sep. 2017; 90 pages.
3GPP TS 23.003 V15.1.0; 3rd Generation Partnership Project; Technical Specification Group Core Network and Terminals; Numbering, Addressing and Identification; Release 15; Sep. 2017; 109 pages.
3GPP TS 23.060 V15.0.0; 3rd Generation Partnership Project; Technical Specification Group Services and System Aspects; General Packet Radio Service (GPRS); Service Description; Stage 2; Release 15; Sep. 2017; 367 pages.
3GPP TS 23.122 V15.1.0; 3rd Generation Partnership Project; Technical Specification Group Core Network and Terminals; Non-Access-Stratum (NAS) Functions Related to Mobile Station (MS) in Idle Mode; Release 15; Sep. 2017; 54 pages.
3GPP TS 23.203 V15.0.0; 3rd Generation Partnership Project; Technical Specification Group Services and System Aspects; Policy and Charging Control Architecture; Release 15; Sep. 2017; 257 pages.
3GPP TS 23.246 V14.2.0; 3rd Generation Partnership Project; Technical Specification Group Services and System Aspects; Multimedia Broadcast/Multicast Service (MBMS); Architecture and Functional Description; Release 14; Sep. 2017; 76 pages.
3GPP TS 23.280 V14.3.0; 3rd Generation Partnership Project; Technical Specification Group Services and System Aspects; Common Functional Architecture to Support Mission Critical Services; Stage 2; Release 14; Sep. 2017; 142 pages.
3GPP TS 23.334 V14.3.0; 3rd Generation Partnership Project; Technical Specification Group Core Network and Terminals; IP Multimedia Subsystem (IMS) Application Level Gateway (IMG-ALG)—IMS Access Gateway (IMS-AGW) Interface; Procedures Descriptions; Release 14; Jun. 2017; 207 pages.
3GPP TS 23.401 V15.1.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 15; Sep. 2017; 397 pages.
3GPP TS 23.468 V14.0.0; 3rd Generation Partnership Project; Technical Specification Group Services and System Aspects; Group Communication System Enablers for LTE (GCSE_LTE); Stage 2; Release 14; Mar. 2017; 29 pages.
3GPP TS 24.334 V15.0.0; 3rd Generation Partnership Project; Technical Specification Group Core Network and Terminals; Proximity-Services (ProSe) User Equipment (UE) to ProSe Function Protocol Aspects; Stage 3; Release 15; Sep. 2017; 263 pages.
Bgpp Ts 24.379 V14.3.0; 3rd Generation Partnership Project; Technical Specification Group Core Network and Terminals; Mission Critical Push to Talk (MCPTT) Call Control; Protocol Specification; Release 14; Sep. 2017; 529 pages.
3GPP TS 24.386 V14.2.0; 3rd Generation Partnership Project; Technical Specification Group Core Network and Terminals; User Equipment (UE) to V2X Control Function; Protocol Aspects; Stage 3; Release 14; Sep. 2017; 34 pages.
3GPP TS 27.007 V14.5.0; 3rd Generation Partnership Project; Technical Specification Group Core Network and Terminals; AT Command Set for User Equipment (UE); Release 14; Sep. 2017; 349 pages.
3GPP TS 31.102 V14.3.0; 3rd Generation Partnership Project; Technical Specification Group Core Network and Terminals; Characteristics of the Universal Subscriber Identity Module (USIM) Application; Release 14; Jun. 2017; 289 pages.
3GPP TS 33.180 V14.1.0; 3rd Generation Partnership Project; Technical Specification Group Services and System Aspects; Security of the Mission Critical Service; Release 14; Sep. 2017; 131 pages.
3GPP TS 33.203 V15.0.0; 3rd Generation Partnership Project; Technical Specification Group Services and System Aspects; 3G Security; Access Security for IP-Based Services; Release 15; Sep. 2017; 145 pages.

(56) References Cited

OTHER PUBLICATIONS

3GPP TS 33.401 V15.1.0; 3rd Generation Partnership Project; Technical Specification Group Services and System Aspects; 3GPP System Architecture Evolution (SAE); Security Architecture; Release 15; Sep. 2017; 161 pages.

ETSI Technical Specification; ETSI TS 131 111 V11.6.0; Digital Cellular Telecommunications System (Phase 2+); Universal Mobile Telecommunications System (UMTS); LTE; Universal Subscriber Identity Module (USIM) Application Toolkit (USAT) (3GPP TS 31.111 version 11.6.0 Release 11); Jul. 2013; 132 pages.

Hardt, D.; "The OAuth 2.0 Authorization Framework"; RFC 6749; Oct. 2012; 76 pages.

Jones, M., et al.; "JSON Web Token (JWT) Profile for OAuth 2.0 Client Authentication and Authorization Grants"; RFC 7523; May 2015; 12 pages.

PCT International Search Report & Written Opinion of the International Searching Authority; PCT/US2018/061328; dated Jun. 6, 2019; 18 pages.

3GPP TS 23.781 V1.2.0; 3rd Generation Partnership Project; Technical Specification Group Services and System Aspects; Study on Migration and Interconnection for Mission Critical Services; Release 15; May 2017; 66 pages.

3GPP TSG-SA WG6 Meeting #17; "Editorial Updates"; S6-170516; Prague, Czech Republic; May 8-12, 2017; 20 pages.

PCT Invitation to Pay Additional Fees; PCT/US2018/061328; dated Feb. 28, 2019.

European Examination Report; Application No. 18816360.4; dated May 11, 2022; 5 pages.

Chinese Office Action; Application No. 201880084703.3; dated Apr. 4, 2023; 6 pages.

Japanese Office Action; Application No. 2020-527010; dated Dec. 21, 2022; 3 pages.

Canadian Office Action; Application No. 3,082,596; dated Sep. 27, 2023; 3 pages.

\* cited by examiner

PLMN SELECTION FOR MISSION CRITICAL DEVICES

FIELD OF THE DISCLOSURE

The present disclosure relates to methods and systems for selecting a network by a wireless device.

BACKGROUND

In 3$^{rd}$ Generation Partnership Project (3GPP), multiple 3GPP Mission Critical (MC) services are defined, such as Mission Critical Push-To-Talk (MCPTT), Mission Critical Video (MCVideo), Mission Critical Data (MCData), and the like.

MC services are intended to be used by organizations such as public safety or government agencies such as security, police, fire and rescue services, and the like, as well as commercial organizations including utility companies, transportation companies, and the like.

A User Equipment (UE) connected to a Primary MC system may need to migrate to a Partner MC system in certain conditions. However, in some cases, the UE's default mechanism for connecting to a Public Land Mobile Network (PLMN) causes the UE to select a PLMN that cannot provide connectivity to the Partner MC system.

BRIEF DESCRIPTION OF THE DRAWINGS

The present disclosure will be better understood with reference to the drawings, in which.

DETAILED DESCRIPTION OF THE DRAWINGS

Figure 1:
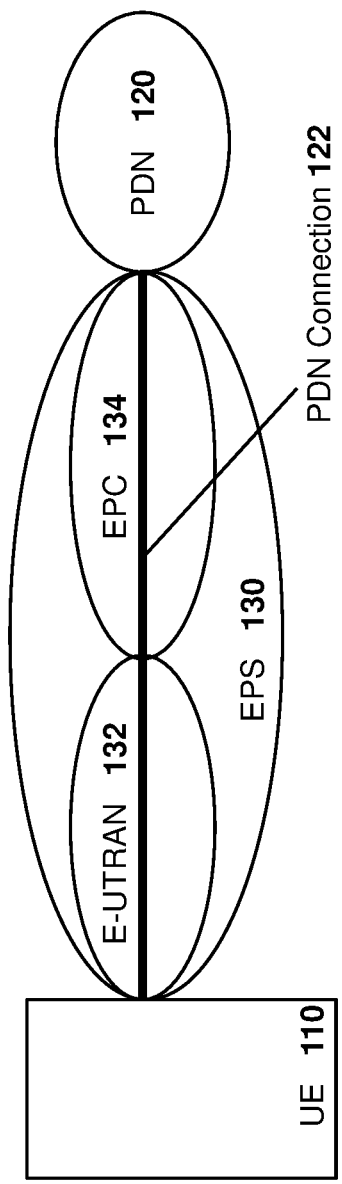
FIG. 1 is a diagram illustrating a user equipment connecting to a packet data network.

The present disclosure provides a method for selecting a Public Land Mobile Network (PLMN) at a user equipment (UE), the method comprising receiving, from a network entity, a list of PLMN identifiers, attempting to register the UE with a network using at least one PLMN identifier from the list of PLMN identifiers, and if the attempt to register with the network is successful, performing a Session Initiation Protocol (SIP) registration to an Internet Protocol (IP) Multimedia Sub-system (IMS) associated to the PLMN identifier.

The present disclosure further provides a user equipment (UE) comprising a processor, and a communications subsystem, wherein the processor and the communications subsystem cooperate to receive, from a network entity, a list of PLMN identifiers, attempt to register the UE with a network using at least one PLMN identifier from the list of PLMN identifiers, and if the attempt to register with the network is successful, performing a Session Initiation Protocol (SIP) registration to an Internet Protocol (IP) Multimedia Sub-system (IMS) associated to the PLMN identifier.

The present disclosure further provides a non-transitory computer readable medium having stored thereon computer-executable code for execution by a processor of a User Equipment (UE), the code comprising instructions for receiving, from a network entity, a list of PLMN identifiers, attempting to register the UE with a network using at least one PLMN identifier from the list of PLMN identifiers, and if the attempt to register with the network is successful, performing a Session Initiation Protocol (SIP) registration to an Internet Protocol (IP) Multimedia Sub-system (IMS) associated to the PLMN identifier.

The present disclosure further provides a method at a network element comprising receiving, from a User Equipment (UE), a message comprising at least one of an indication that the UE wishes to migrate to a partner MC system and a location of the UE, determining a list of Public Land Mobile Network (PLMN) identifiers, wherein each PLMN identifier identifies a PLMN associated to the partner MC system, and transmitting the list of PLMN identifiers to the UE.

The present disclosure further provides a method at a User Equipment (UE), comprising detecting one or more Public Land Mobile Network (PLMN) identifiers for Mission Critical (MC) services, determining a need for PLMN selection to access MC services, storing a first value of a current Registered Public Land Mobile Network (RPLMN) and a second value of a current PLMN selection mode, entering automatic mode of PLMN selection, selecting a PLMN, wherein an identifier of the selected PLMN is from the PLMN identifiers for MC services.

While examples in this disclosure are specific to Long Term Evolution (LTE), Enhanced Packet System (EPS) and Enhanced Universal Mobile Telephony System (UMTS) Terrestrial Radio Access Network (E-UTRAN) examples, it should be noted that the methods, devices, and systems described herein are not limited to those systems or radio access technology, and could be re-used in other systems or radio access technologies. For example, the methods, devices, and systems described herein could be used with systems including, but not limited to, 3GPP General Packet Radio Service (GPRS) Enhanced Data Rates for Global Evolution (EDGE) Radio Access Network (GERAN), UTRAN, 2G or 3G Core Networks, 3GPP 5G, 3GPP New Radio. Also, non-3GPP systems are not excluded, such as Institute of Electrical and Electronics Engineers (IEEE) systems.

LTE networks consist of an LTE radio network and an Enhanced Packet Core (EPC), which together are known as an Enhanced Packet System (EPS). For a 5G system, this comprises of one or both of a Next Generation (NG) radio and NG core network. An EPS/5G system may consist of only a Home Public Land Mobile Network (HPLMN) or an HPLMN and a Visited Public Land Mobile Network (VPLMN). A VPLMN is a Public Land Mobile Network (PLMN) that is not the UE's HPLMN or Equivalent HPLMN (EHPLMN).

A UE attaches or registers to an EPS or PLMN after performing network selection. When a UE attaches or registers to a VPLMN this is known as "roaming". The terms "attach" and "register" are used interchangeably in the present disclosure.

A UE consists of a Mobile Entity (ME) and a Universal Integrated Circuit Card (UICC). Residing on the UICC there is a Universal Subscriber Identity Module (USIM). The USIM contains data that uniquely and globally identifies an EPS user or subscriber, including for example an International Mobile Subscriber Identity (IMSI), as well as other data such as security related data, PLMN selector lists, and the like. Certain fields within the USIM may be remotely configurable and updateable. A typical mechanism for remotely updating fields on a USIM is "SIM-OTA" (Over The Air [OTA]), which typically involves sending a Short Message Service (SMS) message to the ME, which contains a special payload that triggers the ME to send the data transparently to the UICC, where the UICC writes data to the USIM application on the UICC. After the USIM fields have been updated, the UICC sends a REFRESH command, as defined in the $3^{rd}$ Generation Partnership Project (3GPP) Technical Specification (TS) 31.111, *"Universal Subscriber Identity Module (USIM) Application Toolkit (USAT)"*, v.11.6.0, July 2013, to the ME, which in turn may trigger other procedures to execute network selection.

A UE may share its location with other devices in a network using various means such as by providing a Mobile Country Code (MCC), Mobile Network Code (MNC), Global Positioning System (GPS) coordinates, Location Area Code, Tracking Area Code, Routing Area Code, PLMN identifier, Service Set Identifier (SSID), amongst others, and the present disclosure is not so limited. Further, the term "location" within the present disclosure may refer to any of the MCC, MNC, GPS coordinates, Location Area Code, Tracking Area Code, Routing Area Code, PLMN identifier, SSID, amongst others.

A UE wishing to use cellular data connectivity and services via a 3GPP system may make use of one or more Packet Data Networks (PDNs), which may also be known as Data Networks (DNs). The UE, in EPS, uses a PDN connection to transmit and receive point-to-point data, like for example signalling and control plane data, user plane data, voice media, and video media. The Enhanced UMTS Terrestrial Radio Access Network (E-UTRAN) and EPC typically belong to a cellular operator whereas the PDN may belong to an operator or another entity.

The terms UE and ME are used interchangeably within the present disclosure. An ME may include a Terminal Equipment (TE), a Terminal Adapter (TA) and a Mobile Termination (MT). When the present disclosure describes a UE performing a function e.g. registering with or attaching to a PLMN, the function may be performed by either one of the TE, TA or the MT.

Network Selection and PLMN Selector Lists

Before a UE can attach to an LTE network, the UE needs to select to which LTE network or PLMN the UE will attempt to attach/register. Also, the UE can choose to select a new PLMN periodically. The process of network selection by a UE may utilize two PLMN selector lists; an Operator Controlled PLMN Selector list and a User Controlled PLMN Selector list as defined in 3GPP TS 31.102, *"Characteristics of the USIM application"*, version 14.3.0, June 2016. The former is typically configured on the USIM at time of provisioning or manufacturing of the UICC upon which the USIM resides, but can also be updated remotely by the HPLMN (e.g. by SIM-OTA mechanisms), and the latter is configurable by the actual user of the USIM, for example via a user-interface provided by the UE within which the USIM's UICC is inserted. The User Controlled PLMN selector list can be modified by the user only, and the Operator Controlled PLMN Selector list can be modified by the HPLMN only.

There are two modes of network selection that a UE provides to a user and which the user can change between at any time: automatic network selection mode, whereby the UE autonomously selects a network; and manual network selection mode, whereby the user selects a network from a list of available PLMNs presented by the UE via a user interface. In automatic network selection mode, PLMNs listed in the User Controlled PLMN Selector list are selected over those listed solely in the Operator Controlled PLMN Selector list. In manual network selection mode, the User Controlled PLMN Selector List and Operator Controlled PLMN Selector List are not used for selection, however the PLMNs listed in the User Controlled PLMN Selector list may be listed to the user with a higher priority over those listed solely in the Operator Controlled PLMN Selector list.

The UE may also be configured with an equivalent HPLMN (EHPLMN) list in a field on the USIM. The EHPLMN list contains one or more priority ordered PLMN identities that the UE is to consider as its HPLMN when performing network selection. Consequently, PLMN identities configured in the EHPLMN list take priority over PLMN identities configured in the User Controlled PLMN selection list and Operator Controlled PLMN Selector list.

Once a PLMN is selected, the UE attempts to attach or register to the selected PLMN. In automatic selection mode, if registration fails, then the UE can select a different allowed PLMN and reattempt registration until either registration succeeds or all available PLMNs have been attempted. In manual selection mode, if registration fails, then the UE can prompt the user to reselect a PLMN.

After the UE has performed a successful registration to a PLMN, the UE may, at different times or upon the occurrence of various events, download from the registered PLMN (RPLMN) a list of PLMN identities that the UE is to assume are equivalent to the RPLMN. The equivalent PLMN list is typically received by the UE from the RPLMN in a dedicated downlink Attach Accept message and is then stored in the ME along with the current PLMN identifier of the RPLMN from which the list was received. All PLMNs in the equivalent PLMN list are regarded as equivalent to each other and to the current RPLMN for the purposes of PLMN selection, cell selection, handover, etc.

At any time, a UE that is in automatic selection mode can be instructed by its HPLMN to search for another, specific VPLMN, and if the specific VPLMN is available and a move is permitted, move to that VPLMN as soon as possible. This VPLMN is then regarded as the highest priority VPLMN as defined by the operator, though the HPLMN, EHPLMN and PLMN on the User Controlled PLMN list still have a higher priority. This is typically achieved by replacing the highest priority PLMN obtained from the Operator Controlled PLMN Selector list with the desired VPLMN.

In some cases, when a UE is roaming and attempts registration to a VPLMN, the VPLMN requests authentication information from the HPLMN. The HPLMN may then reply to the VPLMN with a temporary failure message which is passed on to the UE. At that point, the UE may try again or select a new VPLMN, depending on such factors as whether the UE is in automatic selection mode or manual selection mode.

Mission Critical Services

In 3GPP, multiple 3GPP Mission Critical (MC) services are defined, such as Mission Critical Push-To-Talk (MCPTT), Mission Critical Video (MCVideo), Mission Critical Data (MCData), and the like.

Mission Critical services can make use of on-network communications and off-network communications. On-network MC communications are defined to run over PDN connections via an EPS, amongst other connection types, whilst off-network communications rely on the use of UE-to-UE Proximity Services. On-network MC communications make use of an IP Multimedia (core network) Subsystem (IMS) or a Session Initiation Protocol (SIP) core for some communications, therefore the MC service UE needs to perform an IMS/SIP registration after setting up a PDN connection in order to be able to use all aspects of MC services.

The general architecture for on-network Mission Critical is defined, for example, in 3GPP TS 23.380, *"Common functional architecture to support mission critical services; Stage 2"*, version 14.1.0, December 2016.

Sections 7.2 and 7.3 of 3GPP TS 23.380 is excerpted below:

TABLE 1

Sections 7.2 and 7.3 of 3GPP TS 23.380

7.2 Description of the planes
The following planes are identified:
a)   application plane: The application plane provides all of the services (e.g. call control, floor control, video control, data control) required by the user together with the necessary functions to support MC service. It uses the services of the signalling control plane to support those requirements. For example, within the MCPTT service, the application plane also provides for the conferencing of media, and provision of tones and announcements; and
b)   signalling control plane: The signalling control plane provides the necessary signalling support to establish the association of users involved in an MC service, such as an MCPTT call or other type of MC services. The signalling control plane also offers access to and control of services across MC services. The signalling control plane uses the services of the bearer plane.
Bearers supporting these planes are defined for LTE within 3GPP TS 23.401[17].
The resource control that is needed to support these planes is defined within 3GPP TS 23.203 [8]. The application plane also relies on the use ofmulticast bearers established via procedures defined in 3GPP TS 23. 468 [18] and 3GPP TS 23.246 [11].
7.3          Functional model description
7.3.1        On-network functional model
Each MC service can be represented by an application plane functional model. The functional model across MC services may be similar but is described by the individual functional entities and reference points that belong to that MC service. Within the application plane for an MC service there is a common set of functions and reference points. The common set is shared across services. This common set of functions and reference points is known as the common services core.

MC Systems typically comprise a plurality of servers for managing the functionality of the system. Such servers include MC service servers, group management servers, configuration management servers, identity management servers, key management servers, and location management servers. Each of these servers may have a counterpart client running on an MC UE. For example an MC UE may comprise MC service clients, a group management client, a configuration management client, an identity management client, key management client, and a location management client. The clients residing on the UE are applications which cooperate with their respective servers in order to provide MC services to the UE user. As will be appreciated, each client may be implemented in its own application or be implemented as a module within a general MC application. In at least one embodiment, the MC service clients may comprise one or more of an MCPTT client, an MCVideo client, and an MCData client.

A Mission Critical organization can run its own cellular network but typically Mission Critical Organizations utilize a PLMN operator's cellular network e.g. EPS. The PLMN that a Mission Critical Organization utilizes for its MC users or MC service users is known hereafter as the Mission Critical Organization's HPLMN, and is the HPLMN identified by data within the USIM within the MC service UEs.

In some deployment scenarios, commercial PLMN operators may operate the Internet Protocol (IP) Multimedia Subsystem (IMS) and/or Session Initiation Protocol (SIP) core network for a Mission Critical organization's MC service while the MC application server, such as an MCPTT server, an MCVideo server, an MCData server, and other application layer network entities may either be operated by the Mission Critical organization or a Mission Critical service provider on behalf of one or more Mission Critical organizations, such as the United States First Responders Network Authority (FirstNet). Communications of some Mission Critical organizations, for example communications by public safety agencies and their users are considered highly privacy-sensitive not only in terms of the actual media communication, but also in terms of the identities of the users/parties involved in a communication and the nature of that communication.

Migration is an aspect of the Mission Critical framework that provides a means for an MC service user to obtain MC services directly from a partner MC system that is not their Mission Critical organization's MC system, which is known as the home MC system or primary MC system.

In order for an MC service user to migrate and be able to use on-network MC communications, the MC service UE may need to attach to a PLMN or EPS or 5GS that is different from the MC service user's primary MC system's HPLMN. This may be due to a lack of radio coverage at the location of the MC service UE of the primary MC system's HPLMN, or due to a lack of PDN connectivity from the primary MC system's HPLMN to the partner MC system to which the MC service user wishes to migrate. After attaching to the partner MC system's HPLMN, the MC service UE can then perform the MC migration to the partner system and start receiving MC services from the partner MC system. Migration may involve such steps at the UE for example: perform identity management to an identity management server of the partner MC system; perform an IMS/SIP registration to the IMS or SIP core of the partner MC system; etc. Within the context of the present disclosure, the terms IMS core and SIP core may be used interchangeably.

When an MC user wishes to migrate to a partner MC system, and the HPLMN of the partner MC system differs from the HPLMN of the primary MC system, then the MC user's UE needs to be able to register with the HPLMN of the partner MC system as a VPLMN in order to connect to the correct PDNs that provide access to the partner MC system. However, it is possible that the MC service UE selects a VPLMN that is not the partner MC system's HPLMN. This may be due to the partner MC system's HPLMN being absent from both the Operator Preferred PLMN list and the User Preferred PLMN list in the USIM of the MC service user's UE, or due to the partner MC system's HPLMN being present on the Operator Preferred PLMN list or the User Preferred PLMN list in the USIM of the MC service user's UE but another available PLMN has higher priority, etc.

MC service user authentication and authorization procedures utilize the OpenID framework in 3GPP, which includes an ID_token and Access_token, amongst possibly other tokens such as for example, a Refresh_token, or the like. The tokens are obtained as per the OAuth 2.0 protocol, defined in Internet Engineering Task Force (IETF) Request for Comments (RFC) 7523, *"JSON Web Token (JWT) Profile for OAuth 2.0 Client Authentication and Authorization Grants"*, May 2015, via the procedure described in 3GPP TS 33.180, *"Security of the mission critical service"*, version 14.1.0, September 2017.

UEs may also communicate directly with each other without the use of a network infrastructure. ProSe provides a set of functionalities that allow a UE to discover other UEs that are in close proximity and then to communicate directly without using any network infrastructure to those other UEs. The latter is known as "direct communication", "device to device" (D2D), PC5 communication, or sidelink communication. Communications of this type may, but need not, take place in a dedicated or specific set of radio spectrum. That is, such communications need not take place in radio spectrum different than that used by PLMN operators' radio infrastructure. As spectrum is a finite resource, it is expected that a limited number of networks and PLMNs would offer such communications in any single geographical area, and as such a ProSe specific PLMN selection procedure, "PLMN selection triggered by ProSe direct communication", has been defined to allow a UE to find such a spectrum in section 3.1B of 3GPP TS 23.122 *"Non-Access-Stratum (NAS) functions related to Mobile Station(MS) in idle mode"*, version 15.1.0, September 2017.

Subclause 5.1.1 of 3GPP TS 24.334 *"Proximity-services (ProSe) User Equipment (UE) to ProSe function protocol aspects; Stage 3"* (Rel-15), version 15.0.0, September 2017, currently states "In this release of the specification, ProSe direct communication using E-UTRA technology is supported only for Public Safety ProSe-enabled UE." However, ProSe direct communication using other access technologies such as a Wireless Local Area Network (WLAN) is not explicitly excluded for other UEs and services. In addition, Vehicle-to-Vehicle or Vehicle-to-Infrastructure (V2X) can also make use of ProSe over E-UTRAN ("PLMN selection triggered by V2X communication over PC5"), as specified in section 6.1.2.3 of 3GPP TS 24.286 *"User Equipment (UE) to V2X control function; protocol aspects; Stage 3"*, version 14.0.0, March 2017, and section 3.1C of 3GPP TS 23.122.

Data Connectivity

A UE wishing to use cellular data connectivity or services may make use of at least one Evolved-Universal Mobile Telephony System (UMTS) Terrestrial Radio Access Network (E-UTRAN), Enhanced Packet Core (EPC) and a Packet Data Network (PDN). The combination of an E-UTRAN and an EPC is known as an enhanced packet system (EPS). For a 5G system, this comprises of one or both of a Next Generation (NG) radio and NG core network.

Reference is now made to FIG. 1. In the example of FIG. 1, UE 110 connects with a PDN 120 utilizing a PDN connection 122. Such PDN connections may, in some embodiments, be referred to as packet data protocol (PDP) contexts in second generation (2G) or third generation (3G) networks, or referred to as Packet Data Unit (PDU) sessions in fifth generation (5G) networks. PDN connection 122 may be used to transmit and receive data such as signaling or control plane data, user plane data, voice/audio media, video media among other data options, between the UE 110 and PDN 120. A PDN, which may also be known as a Data Network (DN), provides a mechanism for a UE to communicate with (i.e. send and receive data) other entities connected to or via the PDN.

PDN connection 122 is typically over an E-UTRAN 132 and EPC 134, as provided in FIG. 1. However, in other embodiments the connectivity may be over a wireless local area network (WLAN) and an EPC, and the present disclosure is not limited to a particular PDN connection 122.

The E-UTRAN 132 and EPC 134 typically, but not always, belong to a mobile network operator or cellular carrier, whereas the PDN 120 may belong to an operator or other entity. For example, the PDN may belong to a corporation or an enterprise network.

EPS 130 may consist of only an HPLMN ($1^{st}$ service provider) or may further consist of HPLMN and a Visiting Public Land Mobile Network (VPLMN) ($2^{nd}$ service provider), with the latter being used for roaming. Such HPLMN and VPLMN are not shown in FIG. 1 for brevity.

EPS 130 may consist of various entities. These include one or more of an enhanced Node B (eNB), Mobile Management Entity (MME) Serving Gateway (S-GW), PDN Gateway (P-GW), or Home Subscriber Server (HSS), among other network nodes.

PDN connection 122 provides a path for data between a UE 110 and a PDN 120. During PDN connection establishment, the PDN 120 is identified by an access point name (APN) or a Data Network Name (DNN), and thereafter by other parameters in the established PDN connection. The APN can identify a gateway node (e.g. P-GW, a Gateway General Packet Radio Service (GPRS) Support Node (GGSN)), among others, in the EPC 134 that allows access to the PDN 120.

As defined in the $3^{rd}$ Generation Partnership Project (3GPP) Technical Specification (TS) 23.003, *"Numbering, addressing and identification"*, as for example provided in v.14.3.0, March 2017, an APN consists of a network identity (NI) and an operator identity (OI) portion. Both the NI and OI portions consist of a string of characters separated by dots. The characters in between the dots are referred to as "labels".

In one embodiment, the content of the NI portion may be undefined, whereas the content of the OI portion is strictly defined. The OI portion is generally appended by the network to the end of an NI. Network nodes that may perform this function include, but are not limited to, the Serving GPRS Support Node (SGSN), MME, S-GW, P-GW, among others.

In other embodiments, the UE may provide both the NI and OI if the UE wishes to specifically request breakout to a PDN in a specific Public Land Mobile Network (PLMN) and in the absence of the OI being provided by the UE, the network uses defined logic to decide the OI to append to the NI. Such defined logic, for example, may be found in 3GPP TS 23.060, "*General Packet Radio Service (GPRS); Service description; Stage 2*", as for example provided in v.14.4.0, June 2017.

A UE is roaming when it is not attached to a PLMN that is its home PLMN or an Extended HPLMN (EHPLMN). When the UE is roaming, a PDN connection may connect to a PDN in the VPLMN or HPLMN. A connection to a PDN in the VPLMN is sometimes referred to as "local break-out" (LBO). A connection to a PDN in the HPLMN is sometimes referred to as "home routed" or S8 Interface Home Routed ("S8HR).

UICC-Based Selection Solution

Figure 2:
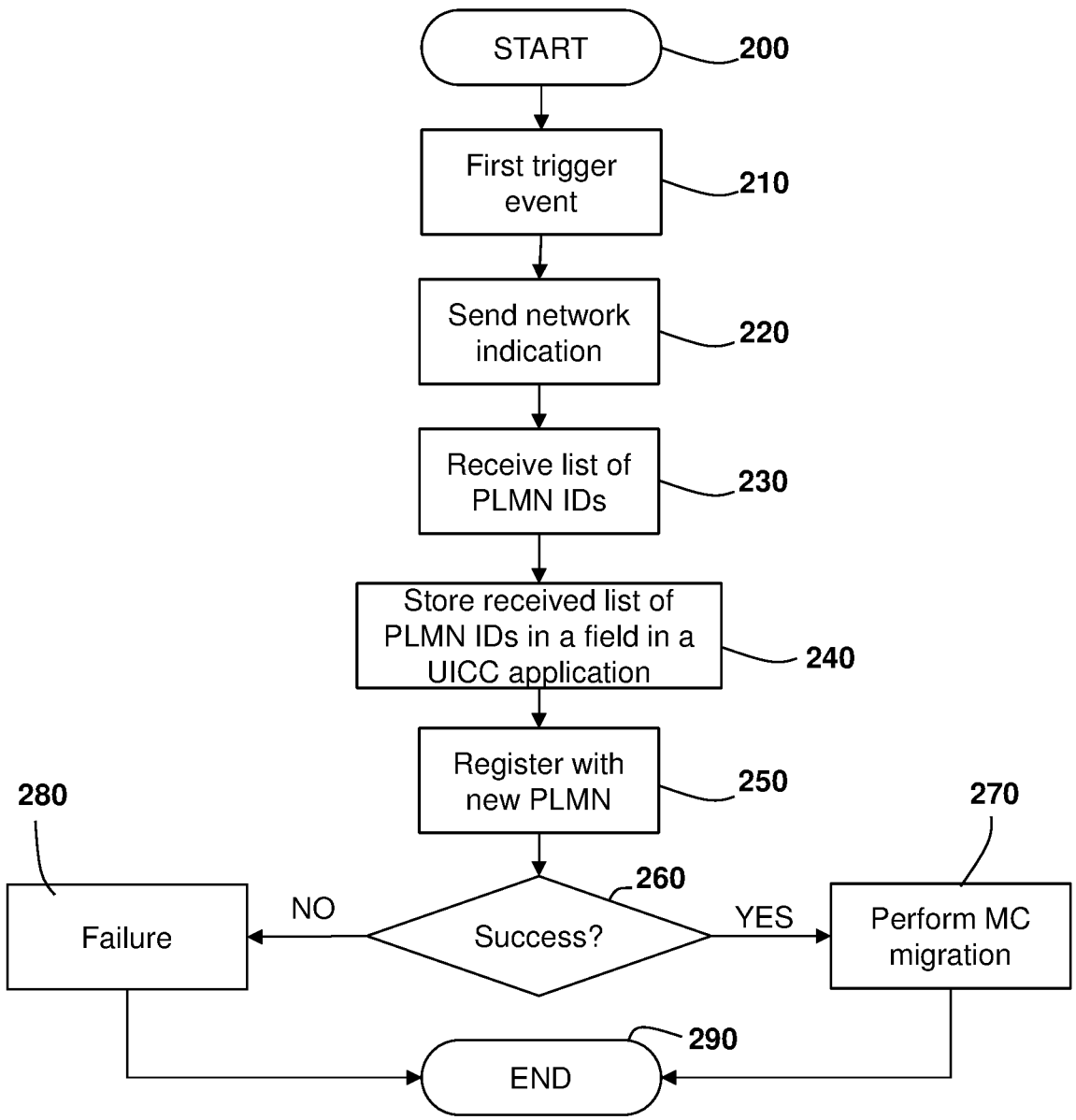
FIG. 2 is a flow diagram of a method according to at least one embodiment of the present disclosure.

Reference is now made to FIG. 2, which shows a flow diagram of a process according to at least one embodiment of the present disclosure.

The process starts at block 200 and proceeds to block 210 in which a first trigger event occurs. The first trigger event maybe one or a combination of the following:
- an MC service UE registers with a new or different PLMN;
- a timer expires;
- the HPLMN of the primary MC system becomes unavailable to the UE;
- the UE receives a message indicating that it should migrate to a partner MC system;
- the UE receives an authorization to receive MC services;
- the MC service client is provisioned or activated at the UE;
- the UE enters a particular location.

Other events could serve as a trigger for block 210 and the present disclosure is not limited to the above.

The process then proceeds to block 220, where the UE sends an indication to a network element. The indication may provide information on the trigger event of block 210. The indication may also provide information such as the current location of the UE, and a list of currently available PLMNs.

The network element may be located in the primary MC system or the partner MC system, and may be one or more of a configuration management server, an identity management server, an MC server, amongst other options.

Once the indication has been transmitted to the network element, the process proceeds to block 230, where the UE receives a list of PLMN identifiers from the network element. The PLMNs corresponding to the PLMN identifiers received by the UE are PLMNs which may allow the UE to migrate to a new partner MC system. In at least one embodiment, the received list of PLMN identifiers correspond to PLMNs that allow the UE to migrate to a new partner MC system based on the current location of the UE and/or PLMNs which are available to the UE.

The UE then stores the received list of PLMN identifiers, either in internal memory or in a field in an application on a UICC, e.g. a field of the USIM at block 240. According to at least one embodiment, the field in an application on a UICC is the User Controlled PLMN Selector list in the USIM.

The process then proceeds to block 250, in which the UE registers with one of the PLMNs identified by the received PLMN identifiers. The registration attempts may for example occur automatically as a result of the storing of the received list of PLMN identifiers in a field in a UICC application, or following an AT command issued by an application layer process, such as the MC service client.

An AT command allows an application layer to write data, read data, or force execution of a procedure by lower layers of a mobile device, such as for example, the modem chipset. AT commands are described in 3GPP TS 27.007 "*AT command set for User Equipment (UE)*", version 14.5.0, September 2017.

The AT commands which may be used in the context of the present disclosure comprise:

Selection of preferred PLMN list +CPLS: As defined in section 7.20 of 3GPP TS 27.007, this AT command provides a mechanism for upper layers of the UE to determine which PLMN selector lists are provisioned or supported on the UICC application.

Preferred PLMN list +CPOL: As defined in section 7.19 of 3GPP TS 27.007, this AT command provides a mechanism for upper layers of the UE to instruct lower layers to: read data from the User Controlled PLMN Selector list and Operator Controlled PLMN Selector list, and provide this information to the upper layers of the ME; and write specified data to the User Controlled PLMN Selector list and Operator Controlled PLMN Selector list.

PLMN selection +COPS: As defined in section 7.3 of 3GPP TS 27.007, this AT command provides a mechanism for upper layers of the UE to instruct lower layers to force an attempt to select and register with a PLMN according to a "mode" parameter. When "mode" is set to 0, the UE registers with an available RPLMN. When "mode" is set to 1, the UE registers with a specific PLMN with no fallback to another network if the registration fails. When "mode" is set to 4, the UE registers with a specific PLMN with fallback to another network if the registration fails.

If registration of the PLMN at block 250 is successful, as determined at block 260, the UE may subsequently perform MC migration to a partner MC system at block 270 and the process ends at block 290. If registration of the PLMN at block 250 is not successful, as determined at block 260, the process fails at block 280 and ends at block 290. If the process fails at block 280 then the UE may take one or more specific actions, which could include one or a combination of the following:
- presenting an indication on a display or via another user interface e.g. audible, vibration, etc.;
- performing another network PLMN selection procedure;
- sending a message (e.g. containing an indication of a failure to select the received one or more PLMN identifiers) to a functional entity in the primary MC system;
- performing off-network MC services.

In order to migrate to a partner MC system, the UE registers with an IMS associated to the PLMN identifier. MC migration may also be performed using the functionality as defined in patent application US 2017/0134444 which is incorporated by reference.

Iterative Selection Solution

Figure 3:
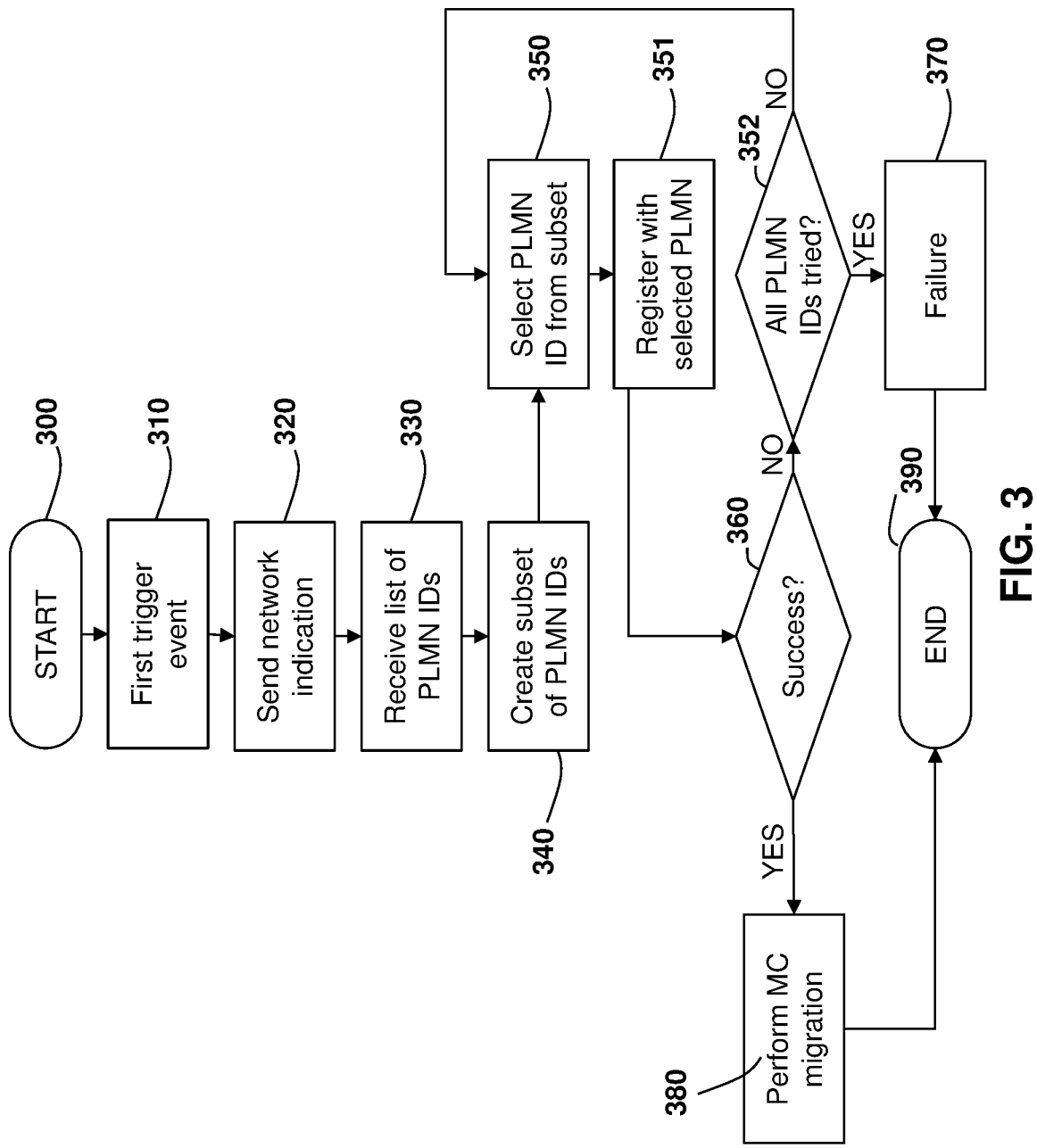
FIG. 3 is a flow diagram of a method according to at least one embodiment of the present disclosure.

Reference is now made to FIG. 3, which illustrates a process according to another embodiment of the present disclosure.

The process of FIG. 3 starts at block 300 and proceeds to block 310 in which a first trigger event occurs. The trigger event detected at block 310 can include, but is not limited to, one or more of the following:

- an MC service UE registers with a new or different PLMN;
- a timer expires;
- the HPLMN of the primary MC system becomes unavailable to the UE;
- the UE receives a message indicating that it should migrate to a partner MC system;
- the UE receives an authorization to receive MC services;
- the MC service client is provisioned or activated at the UE;
- the UE enters a particular location.

Other events could serve as a trigger for block 310 and the present disclosure is not limited to the above.

The process then proceeds to block 320, where the UE sends an indication to a network element. The indication may provide information on the trigger event of block 310. The indication may also provide information such as the current location of the UE, and a list of currently available PLMNs. The indication could be explicit, in that it could be an indication that the wireless device wants to perform migration or it could be implicit. For example, an implicit indication may include location information which implies the UE needs to perform migration.

The network element may be located in the primary MC system or the partner MC system, and may be one or more of a configuration management server, an identity management server, a MC server, among other options.

Once the indication has been transmitted to the network element, the process proceeds to block 330, where the UE receives a list of PLMN identifiers from the network element. The PLMNs corresponding to the PLMN identifiers received by the UE are PLMNs which may allow the UE to migrate to a new partner MC system. In at least one embodiment, the received list of PLMN identifiers correspond to PLMNs that allow the UE to migrate to a new MC partner based on the current location of the UE and/or PLMNs which are available to the UE. The list of currently available PLMNs may be determined by the UE while performing a scan. The scan may be performed before or at block 340.

The process then proceeds to block 340, where the UE optionally creates a subset of PLMN identifiers from the list of PLMN identifiers received at block 330. The subset is created by determining which PLMNs identified by the PLMN identifiers in the list received at block 330 are currently available to the UE.

The process then proceeds to block 350 in which a PLMN identifier is selected from the subset. The subset may be arranged in a priority order in some embodiments. The priority order may be determined based on the order of the list received at block 330 or may be determined at the UE based on some other factors. Whether the PLMN identifiers are arranged by priority order or not, a PLMN identifier is selected for registration by the UE.

Once a PLMN identifier is selected, the UE attempts registration with the PLMN selected for registration by the UE at step 351. If registration of the PLMN at block 351 is successful, as determined at block 360, to the UE may subsequently perform MC migration to a partner MC system at block 380, and the process ends at block 390.

In order to migrate to a partner MC system, the UE registers with an IMS associated to the PLMN identifier.

If registration of the PLMN at block 351 was not successful, as determined at block 360, the process proceeds to block 352 to check if all PLMN identifiers of the subset have been tried for registration. If all PLMN identifiers have already been tried, the process fails at block 370 and ends at block 390. If the process fails at block 370 then the UE may take one or more specific actions, which could include one or a combination of the following:

- presenting an indication on a display or via another user interface;
- performing another network PLMN selection procedure;
- sending a message (e.g. containing an indication of a failure to select the received one or more PLMN identifiers) to a functional entity in the primary MC system;
- performing off-network MC services.

Otherwise, the process returns to block 350 to select a new PLMN identifier from the subset. This newly selected PLMN identifier is then used to attempt registration at block 351. Therefore, the method iteratively attempts registration with all PLMN identifiers from the subset until registration is successful, or all PLMN identifiers of the subset have been tried.

An example of the changes to 3GPP Standards required to implement the process of FIG. 3 is shown at Appendix B and Appendix C.

Configuration Management Server Configuration Solution

Figure 4:
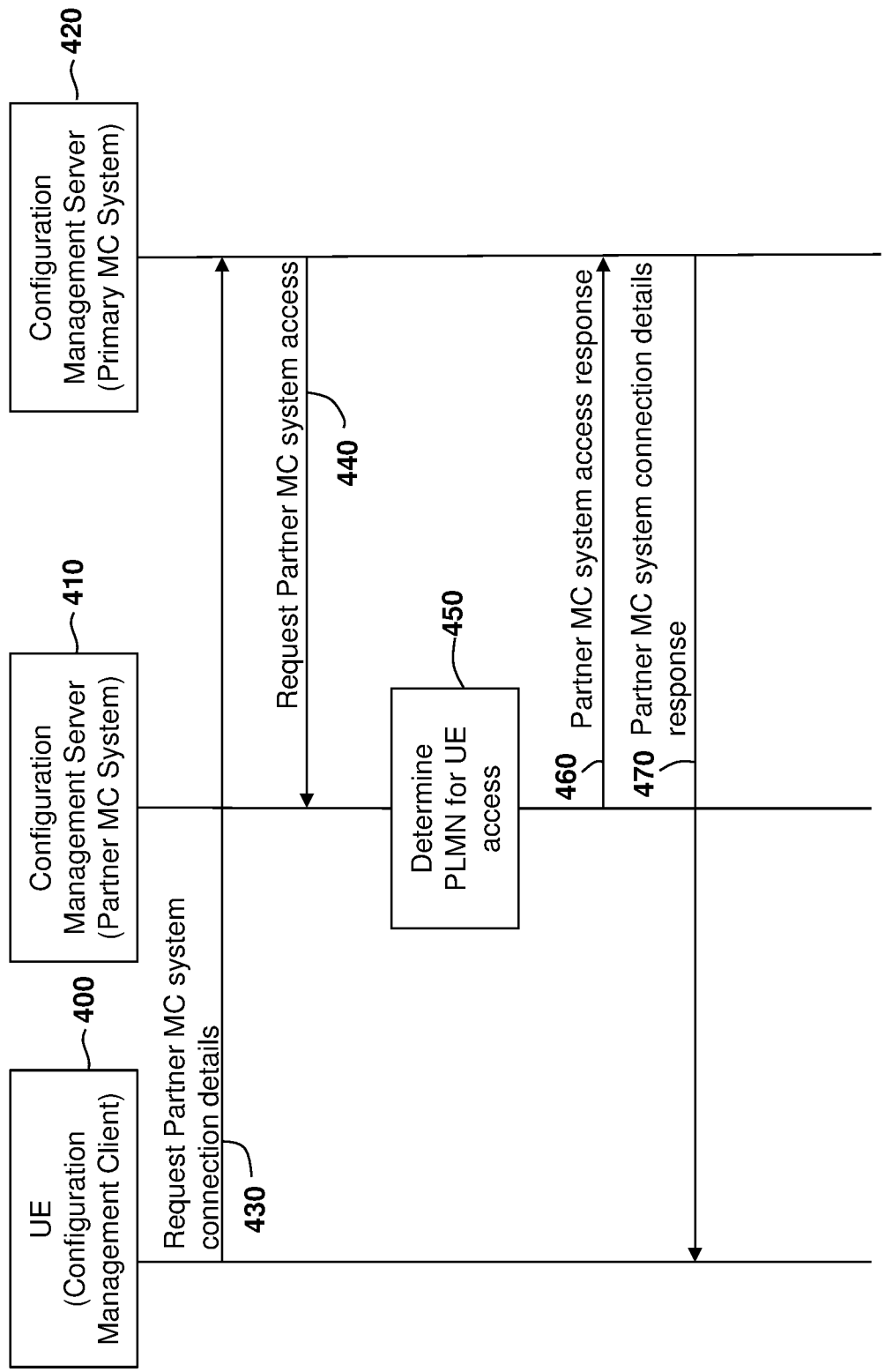
FIG. 4 is a message flow diagram of a method according to at least one embodiment of the present disclosure.

Reference is now made to FIG. 4. FIG. 4 illustrates the exchange of messages during blocks 220 and 230 of FIG. 2, or alternatively, the exchange of messages during blocks 320 and 330 of FIG. 3 discussed above.

The UE 400 may send the configuration management server of the Primary MC System (hereinafter, primary server 420), a message 430 requesting connection details of the Partner MC System. The message 430 may include location information for UE 400, which may include one or more of: a Mobile Country Code (MCC) and a Mobile Network Code (MNC); global positioning coordinates, Global Cell ID, PLMN identifier, Operator ID, etc. Message 430 may also, in some embodiments, include a list of available PLMNs, the MC user identity of the MC user (MC ID), the default SIP private user identity and default SIP public identity from the IMS Subscriber Identity Module (ISIM) of UE 400, and an indication that UE 400 requires PLMN identifiers to access a partner MC system.

Upon receiving message 430, primary server 420 optionally sends the configuration management server of the Partner MC System (hereinafter, partner server 410), a message 440 requesting access to the Partner MC System. Message 440 may include the MC ID associated to UE 400, an identifier of the migration management server of the Primary MC System, SIP identities of the Primary MC System, and an indication of which PLMNs and which Radio Access Technologies (RATs) are available to UE 400.

At block 450, after receiving message 440, partner server 410 determines whether the Primary MC System and UE 400 are authorized to access the Partner MC System. If the Primary MC System and UE 400 are authorized, partner server 410 determines which PLMNs UE 400 may use to access the Partner MC System.

Partner server 410 then responds to request message 440 with a response message 460. Response message 460 is received by primary server 420, and may comprise a list of PLMN identifiers for UE 400 to access the Partner MC System. The list of PLMNs may be ordered by priority, so that the first item in the list is attempted first. According to at least one embodiment, each PLMN identifier in the list is accompanied with an indicator of a RAT to be used on the PLMN.

Primary server 420 may then respond to request message 430 and provide UE 400 with the list of PLMN identifiers that it received from partner server 410, as illustrated by response message 470. UE 400 receives this information and may store it in a memory of the MC client installed on UE 400.

According to at least one embodiment, messages 440, 450, and 460 are omitted, and the list of PLMN identifiers and optionally RATs are provided from primary server 420 to UE 400 without communicating with partner server 410.

According to another embodiment, the UE 300 may send messages 330 to the partner server, the partner server then sends message 340 to the primary server, the primary server then determines which PLMN identifiers to provide UE 300 at block 350, responds to message 340 by sending message 360 to the partner server. The primary server, upon receiving message 360, sends message 370 to UE 300.

The list of PLMN identifiers received at the UE may comprise a list of PLMNs for a single partner MC system. Alternatively, the list of PLMN identifiers may comprise different lists of PLMNs for a plurality of partner MC systems. According to at least one embodiment, the list comprises a first MC system identifier, followed by a list of PLMN identifiers associated to the first MC system identifier. This may be followed by a second MC system identifiers and a list of PLMN identifiers associated to the second MC system identifier, and so on. Therefore, the list of PLMN identifiers may provide the UE with PLMN information for an arbitrary number of potential partner MC systems. According to at least one embodiment, a list of PLMN identifiers may have between zero or more entries.

According to at least one embodiment, each PLMN identifier comprises at least some of the following information:
  Network Service Provider (Mobile Country Code, Mobile Network Code, Service Set Identifier (SSID), etc.)
  Access Technology
  Network Slice
  DNS Server address
  Proxy Call Session Control Function (P-CSCF) address
  Access Point Name (APN) e.g. for Local Breakout, for S8HR, etc.
  APN for home routed services.

Identity Management Server Configuration Solution

Figure 5:
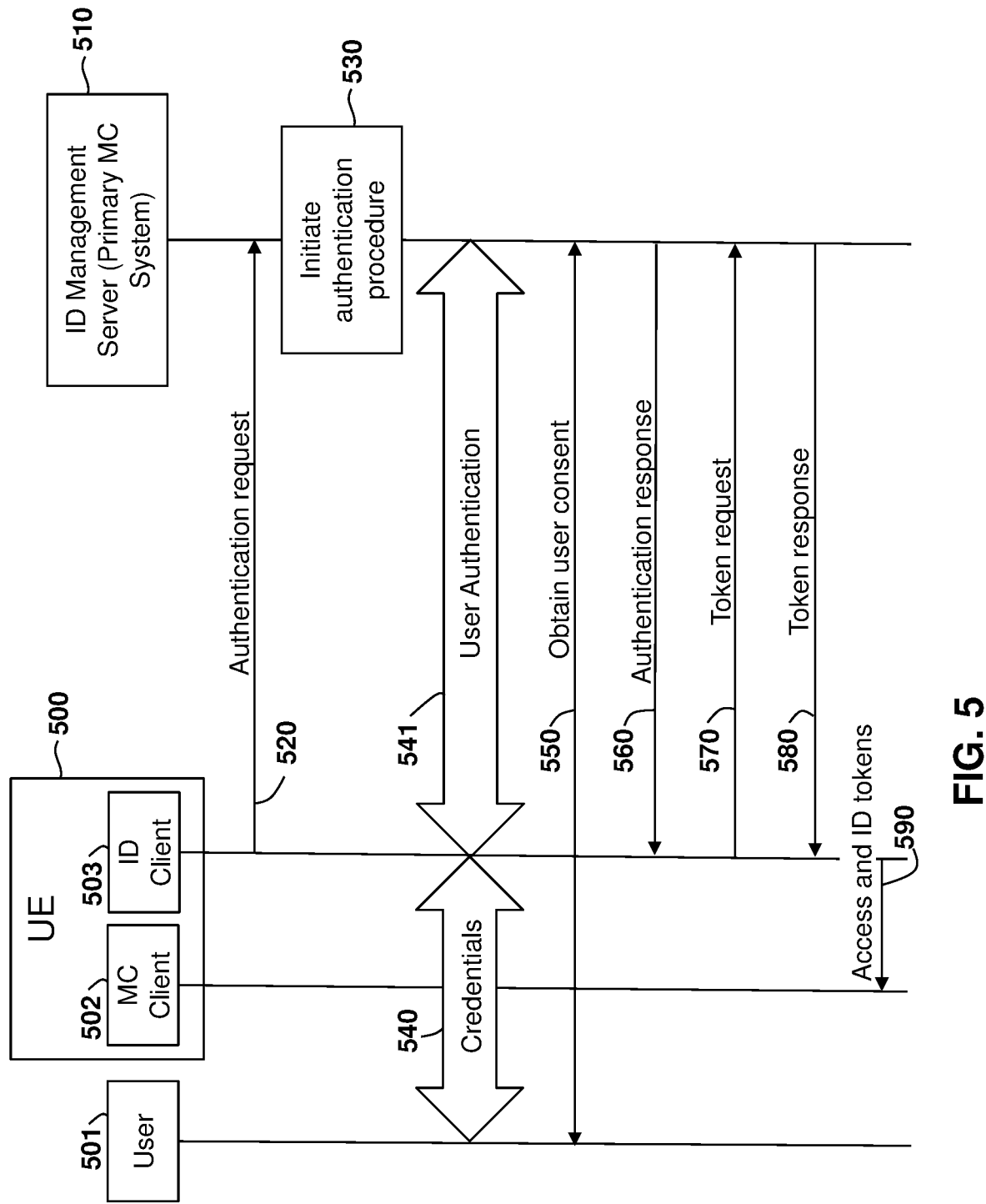
FIG. 5 is a message flow diagram of a method according to at least one embodiment of the present disclosure.

Reference is now made to FIG. 5. FIG. 5 illustrates the exchange of messages when the network entity is an Identity Management Server.

As seen in FIG. 5, the UE 500 is illustrated by two sub-components, namely the MC client 502, and the identity management client 503.

As defined in 3GPP TS 33.180 "Security of the mission critical service", version 14.1.0, September 2017, identity management client 503 issues an authentication request to identity management server 510, as illustrated by request message 520. According to at least one embodiment, the authentication request is a Hyper Text Transfer Protocol Secured (HTTPS) authentication request to an OpenID Connect (OIDC) based identity management server in an MC system, which includes a "code_challenge" value. In addition to what is specified in 3GPP TS 33.180, the identity management client 503 may include, in request message 520, an indication that UE 500 needs PLMN identities to access a partner MC system and location information for UE 500, which may include one or more of: a Mobile Country Code (MCC) and a Mobile Network Code (MNC); global positioning co-ordinates, Global Cell ID, PLMN identifier, Operator ID, etc.

Upon receiving request message 520, identity management server 510 initiates the authentication procedure at block 530.

The identity management client 503 may then obtain user credentials from message 540 and forward these credentials to identity management server 510, as illustrated by message 541. The credentials may include the MC User Identity, and other associated credentials. The identity management client may also include an indication that UE 500 needs PLMN identities to access a partner MC system and location information for UE 500, which may include one or more of: a Mobile Country Code (MCC) and a Mobile Network Code (MNC); global positioning co-ordinates, Global Cell ID, PLMN identifier, Operator ID, etc.

According to at least one embodiment, the identity management server 510 then optionally obtains user consent for granting MC access to MC client 502, as illustrated by arrow 550.

The identity management server 510 then authenticates the credentials obtained in message 541 and provides an authentication response 560. According to at least one embodiment, the authentication response 560 is an HTTPS Found message and includes an authorization code generated by identity management server 510 which is associated with the "code_challenge" provided in request message 520.

The identity management client 503 then requests an access token from identity management server 510, as illustrated by message 570. According to at least one embodiment, message 570 consists of an HTTP POST request to exchange the authorization code for an access token which includes a code-verifier string that is cryptographically associated with the "code_challenge". Furthermore, in some embodiments, message 570 may include an indication that UE 500 needs PLMN identities to access a partner MC system and location information for UE 500, which may include one or more of: a Mobile Country Code (MCC) and a Mobile Network Code (MNC); global positioning co-ordinates, Global Cell ID, PLMN identifier, Operator ID, etc.

The identity management server 510 may then verify that the code-verifier string is correct, and issue a response to the token request as illustrated by response message 580. According to at least some embodiments, response message 580 consists of an HTTPS 200 OK message with an access token and an ID token, to allow the MC client access to MC services. The ID token may also contain a list of PLMN identifiers to be used with a partner MC system. According to at least one embodiment, the list of PLMN identifiers is contained in a JavaScript Object Notation (JSON) Web Token (JWT).

The list of PLMN identifiers received at the UE may comprise a list of PLMNs for a single partner MC system. Alternatively, the list of PLMN identifiers may comprise different lists of PLMNs for a plurality of partner MC systems. According to at least one embodiment, the list comprises a first MC system identifier, followed by a list of PLMN identifiers associated to the first MC system identifier. This may be followed by a second MC system identifiers and a list of PLMN identifiers associated to the second MC system identifier, and so on. Therefore, the list of PLMN identifiers may provide the UE with PLMN information for an arbitrary number of potential partner MC systems.

According to at least one embodiment, each PLMN identifier comprises at least some of the following information:
- Network Service Provider (Mobile Country Code, Mobile Network Code, Service Set Identifier)
- Access Technology
- Network Slice
- DNS Server address
- Proxy Call Session Control Function (P-CSCF) address
- Access Point Name (APN) e.g. for Local Breakout, for S8HR, etc.
- APN for home routed services.

Once identity management client 503 obtains the access token and ID token, they are forwarded to MC client 502, as illustrated by message 590.

In some embodiments, identity management server 510 is part of the Primary MC System, and in other embodiments, identity management server 510 is part of the Partner MC System.

In further embodiments, once identity management client 503 obtains the list of PLMN identifiers, identity management client 503 may forward the list to a configuration management client within the UE 500.

An example of the changes to 3GPP Standards required to implement the process of FIG. 5 is shown at Appendix A.

Determining how to Process Received PLMN Identifiers

Figure 6:
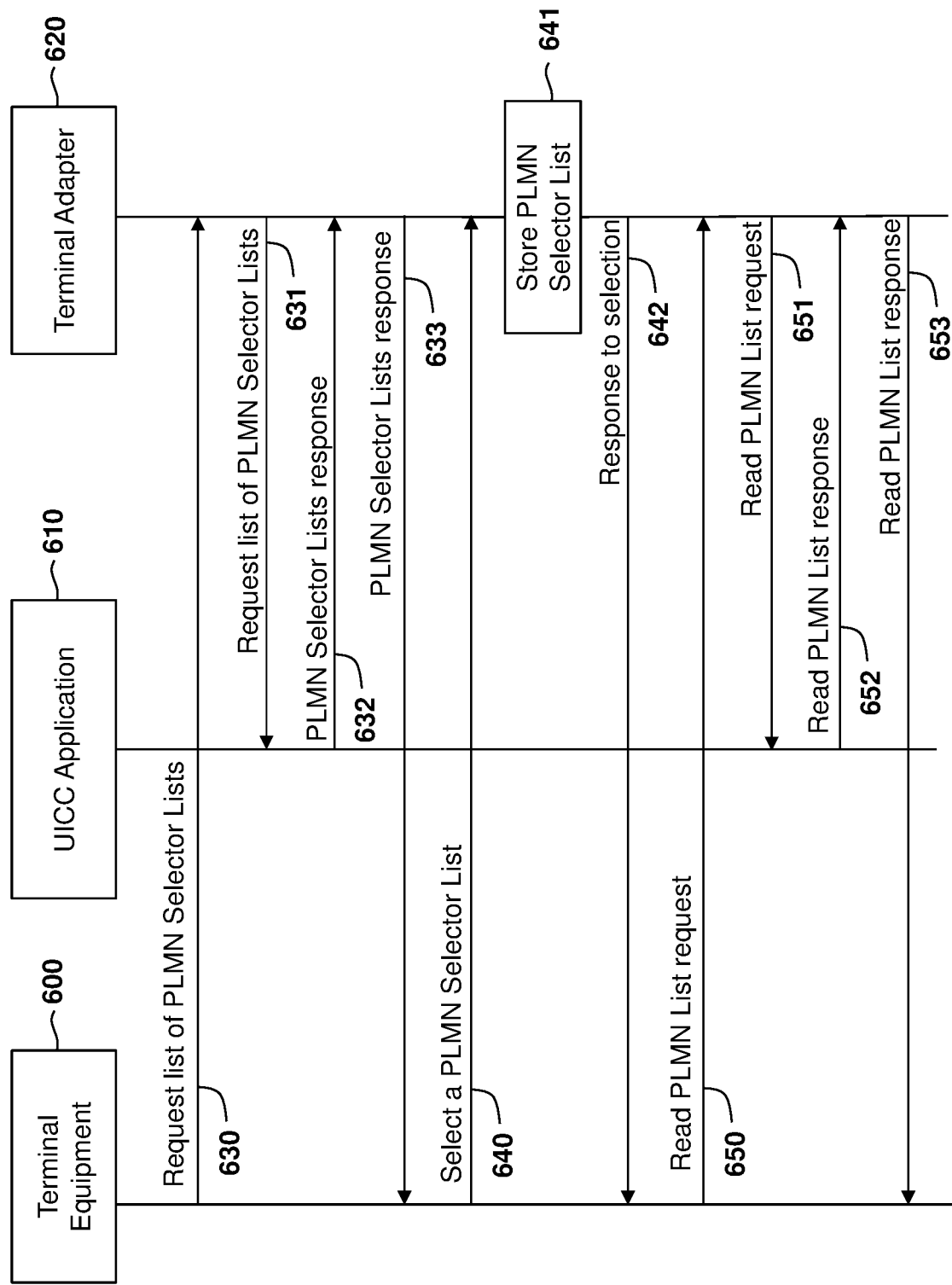
FIG. 6 is a message flow diagram of a method according to at least one embodiment of the present disclosure.

In at least some embodiments of the present disclosure, a UE may decide at run time which of the UICC-based selection solution and Iterative selection solution discussed above, to execute after receiving a list of PLMN identifiers from a network entity. Reference is now made to FIG. 6 which illustrates a procedure that may be performed by the UE to decide how to handle a received list of PLMN identifiers.

As seen in FIG. 6, a TE 600 on a UE can obtain information from a UICC application 610 via a Terminal Adapter 620. The UICC application may be a USIM, however, the present disclosure is not so limited and the method of FIG. 6 could be performed with a different UICC application, such as for example an MC specific UICC application, which may store a PLMN Selector List for particular MC systems.

Terminal Adapter 620 may be part of an operating system of the UE providing an interface between user applications and the UICC. However, the present disclosure is not limited to this configuration. TE 600 is a component of a UE responsible for running client applications, such as an MC client, a configuration management client, identity management client, etc.

The process of FIG. 6 begins when the TE 600 sends the terminal adapter 620 a request to find out which PLMN Selector Lists are stored on the UICC application 610, as illustrated by request 630. Terminal Adapter 620 forwards this request to the UICC application 610, as shown by message 631, and receives a response 632. The Terminal Adapter 620 then forwards the response to TE 600 as response 633.

TE 600 then sends a request to the terminal adapter 620 to select one of the PLMN Selector Lists, as illustrated by request 640. In at least one embodiment, the selected PLMN Selector List is the User Controlled PLMN Selector List. In at least one other embodiment, the selected PLMN Selector List is the Operator Controlled PLMN Selector List. In at least one other embodiment, the selected PLMN Selector List is an MC organization controlled PLMN Selector List.

As indicated by block 641, the terminal adapter 620 then stores which PLMN Selector List was selected, and sends a response to TE 600 as indicated by response 642.

After receiving response 642, TE 600 sends, to terminal adapter 620, a read request for the selected PLMN Selector List, as indicated by request 650. Terminal adapter 620 forwards this request to UICC application 610 as request 651 and receives a reply 652 from UICC application 610. The terminal adapter 620 then sends the content of the selected PLMN Selector List back to the TE 600 as indicated by response 653. TE 600 may then store the PLMN List in its memory.

Further, according to at least one embodiment, a UE may perform the process illustrated in FIG. 6 upon receiving a list of PLMN identifiers from a network element, for example after block 230 of the process of FIG. 2 and after block 330 of the process of FIG. 3. According to this embodiment, if the method of FIG. 6 indicates that a UICC application has a PLMN selector list that may be populated with the received PLMN identifiers, the UE proceeds with the UICC-based selection solution illustrated in FIG. 2. Otherwise, the method of FIG. 6 reveals that there is no such UICC application available, the UE proceeds with the Iterative selection solution illustrated in FIG. 3.

Figure 7:
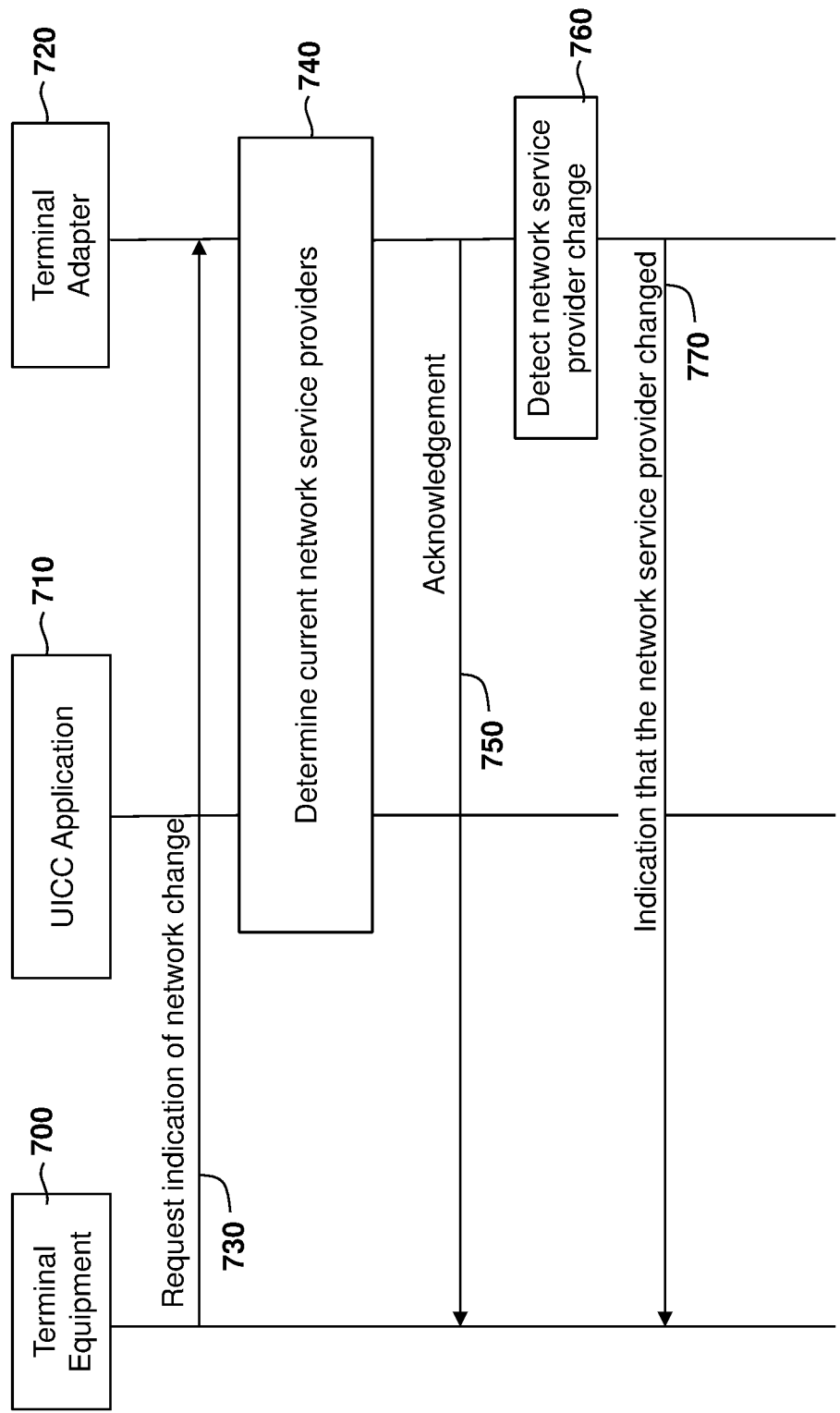
FIG. 7 is a message flow diagram of a method according to at least one embodiment of the present disclosure.

Reference is now made to FIG. 7, which illustrates a process for determining that a first trigger has been met according to at least some embodiments of the present disclosure. In the embodiment of FIG. 7, the first trigger corresponds to a change of network service provider, e.g. a change of RPLMN, a change of SSID, etc. It will be appreciated that this embodiment corresponds to block 210 of FIG. 2 and alternatively to block 310 of FIG. 3.

The process begins when TE 700 sends terminal adapter 720 a request 730 to receive notifications upon a network service provider change. In at least one embodiment, notifications may take the form of an unsolicited response code from the Mobile Termination (MT). Request 730 may take the form of an AT command which configures the MT with instructions to transmit the unsolicited response code upon the network service provider changing.

Then, as shown by block 740, terminal adapter 720 and UICC application 710 cooperate to determine the current network service providers on all current access technologies. In some embodiments, terminal adapter 720 determines the current network service providers on its own.

As illustrated by message 750, terminal adapter then sends an acknowledgement back to TE 700. In at least some embodiments, message 750 includes the list of current network service providers. The list of current network service providers may include information such as PLMN identifier, SSID, etc.

At some later time, the network service provider changes, and this change is detected by the terminal adapter at block 760. The terminal adapter then sends a notification to the TE 700 that the network service provider changed, as illustrated by message 770.

Figure 8:
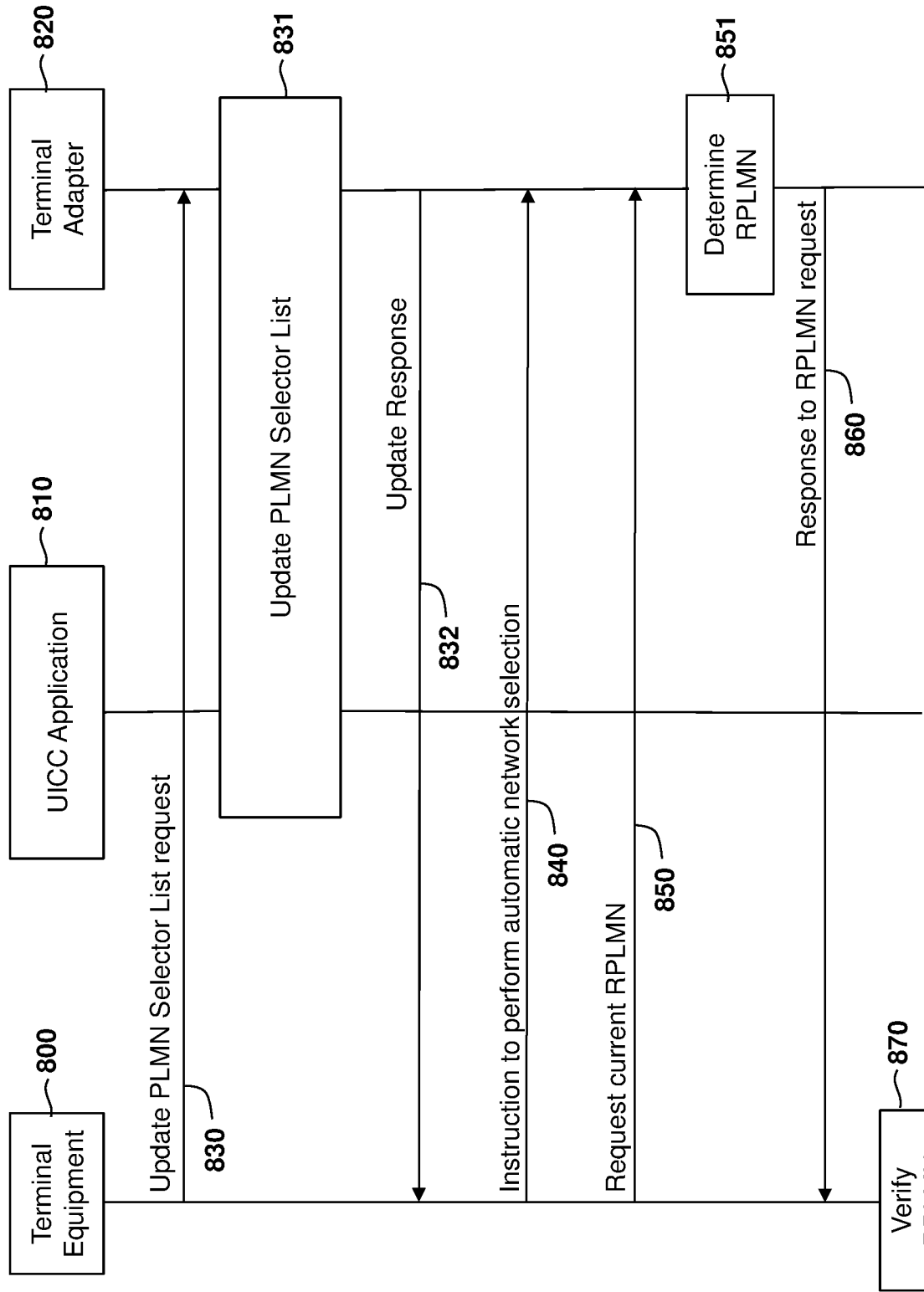
FIG. 8 is a message flow diagram of a method according to at least one embodiment of the present disclosure.

Reference is now made to FIG. 8 which illustrates how the list of PLMN identifiers is handled according to the UICC-based selection solution described above with respect to FIG. 2.

The process of FIG. 8 corresponds to blocks 240 and 250 of FIG. 2. Therefore, at the beginning of the process, the UE has already received a list of PLMN identifiers from a network element.

The process begins when the TE 800 requests an update of a PLMN Selector List, as illustrated by request 830. In at least one embodiment, the PLMN Selector List is the User Controlled PLMN Selector List, but the present disclosure is not so limited and other PLMN Selector Lists may be used. The request includes the list of PLMN identifiers received from a network element earlier. In at least one embodiment, the request consists of the AT command +CPOL.

At block 831 terminal adapter 820 and UICC Application 810 cooperate to update the PLMN Selector List with the list of PLMN identifiers. Typically, terminal adapter 820 sends a message to UICC Application 810 to update an appropriate field of UICC Application 810. In at least one embodiment, UICC Application 810 is USIM.

Once the appropriate PLMN Selector List has been updated, terminal adapter 820 sends a response 832 to TE 800 to indicate that the PLMN Selector List has been updated.

TE 800 then instructs the terminal adapter to perform automatic network selection, as illustrated by message 840. In some cases this step may be omitted as the network selection may occur as a result of the PLMN Selector List having been updated at block 831. In at least some embodiments, message 840 consists of AT command +COPS with "mode" set to 0. The value of 0 is for illustrative purposes only and the present disclosure is not so limited.

TE 800 then requests the current RPLMN in order to verify that an appropriate network to use the partner MC system was selected, as illustrated by message 850. In at least some embodiments, message 850 consists of an AT command. Terminal adapter 820 then determines the RPLMN at block 851 and responds to the TE 800 with the RPLMN as illustrated by response 860.

At block 870, TE 800 verifies that the RPLMN is part of the list of PLMNs received from the network element. If the RPLMN is part of the list, the UE may proceed to migrate to the partner MC system. Otherwise, the UE may take some error handling measure, such as for example displaying an error message, or retrying to select a PLMN from the list of PLMNs received from the network element, e.g. by using the Iterative selection solution.

Figure 9:
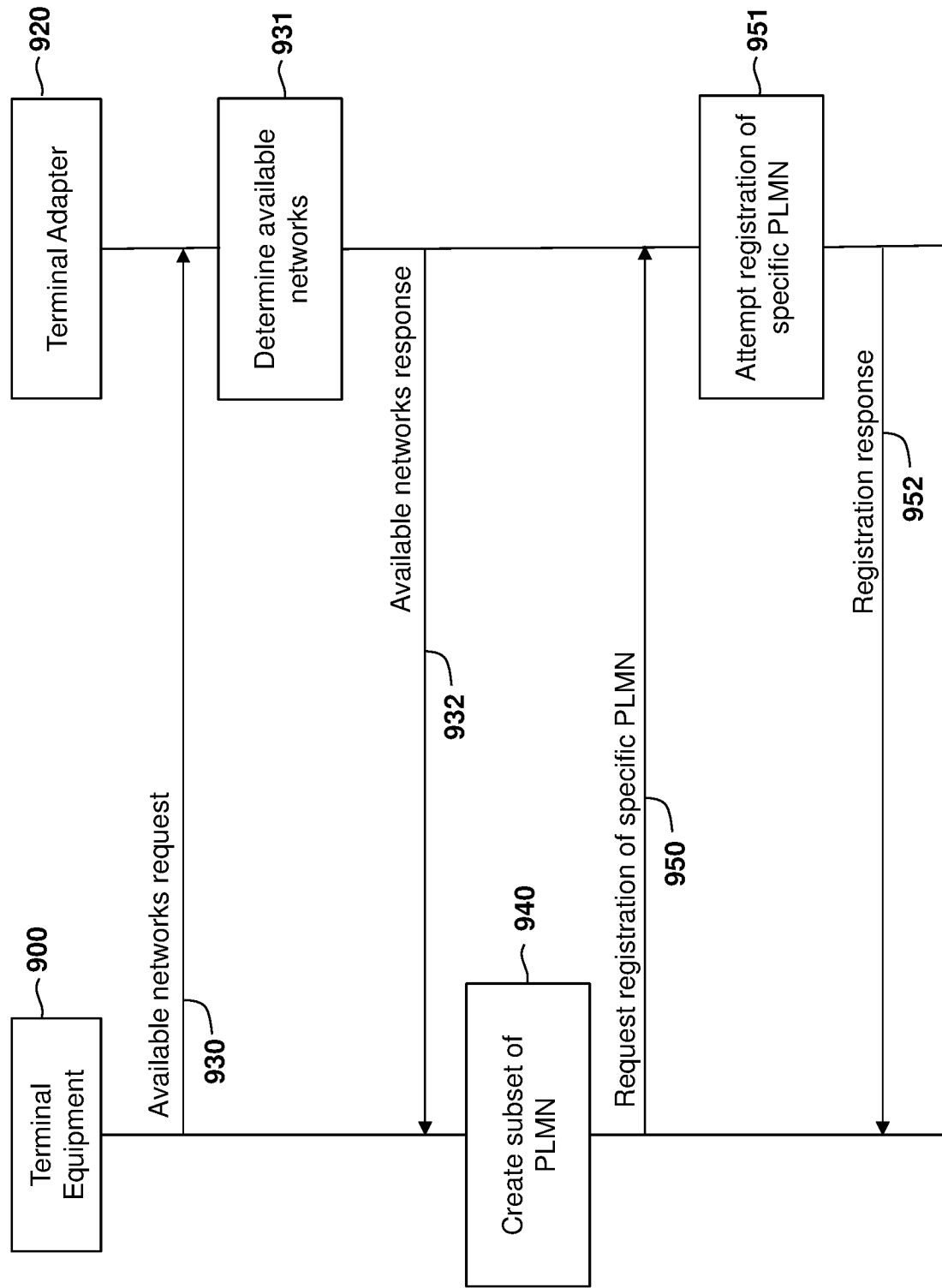
FIG. 9 is a message flow diagram of a method according to at least one embodiment of the present disclosure.

Reference is now made to FIG. 9 which illustrates how the list of PLMN identifiers is handled according to the Iterative selection solution described above with respect to FIG. 3.

The process illustrated in FIG. 9 corresponds to blocks 340, 350, and 351 of FIG. 3. Therefore, at the beginning of the process, the UE has already received a list of PLMN identifiers from a network element.

The process begins as TE 900 sends terminal adapter 920 a request for available networks, as illustrated by message 930. According to at least one embodiment, message 930 consists of an AT command.

At block 931, terminal adapter 920 determines available networks and responds to TE 900 with a list of available networks, as illustrated by response 932.

At block 940, TE 900 creates a subset of PLMN identifiers based on the list of PLMN identifiers received from a network element, and the list of available networks received from terminal adapter 920 in message 932. The subset created at block 940 contains all PLMN identifiers which are common to both the list of PLMN identifiers received from a network element and the list of available networks received from the terminal adapter. In at least one embodiment, the subset is an ordered priority list. The priority may be based on an existing priority from the list of PLMN identifiers received from a network element, or may be created at the UE based on some other factors.

Once the subset of candidate PLMN identifiers is created, TE 900 requests registration of a PLMN identifier selected from the subset, as illustrated by message 950. According to at least one embodiment, message 950 consists of an AT command with "mode" set to 1 if the PLMN identifier is not the last identifier of the subset, and with "mode" set to 4 if the PLMN identifier is the last identifier of the subset. This allows for automatic network selection fallback when the UE attempts to register to a network using the last PLMN identifier of the subset, but not before.

At block 951, terminal adapter 920 attempts registration with the selected PLMN identifier, and reports whether the registration was successful back to TE 900, as illustrated by arrow 952. If registration was successful, the UE may proceed to migrate to a partner MC system. Otherwise, the UE may take some error handling measure, such as for example displaying an error message, or retrying to select a PLMN from the list of PLMNs received from the network element.

Returning to Primary MC System

If a UE that has migrated to a partner MC system wishes to return to its primary MC system, the MC service client can return the UE to automatic network selection mode. The UE may return to its primary MC system due to user input, due to the UE being rebooted or powered off and on, or if the MC services client was deactivated and reactivated, or other similar reasons. If the UE migrated to a partner MC system using the UICC-based selection solution described above and updated a PLMN Selector List on a UICC application, the old value of the PLMN Selector List saved by the TE is rewritten to the UICC application.

One example user equipment that may be used to implement the present disclosure is described below with regard to FIG. 10.

User equipment 1000 may comprise a two-way wireless communication device having voice or data communication capabilities or both. User equipment 1000 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 1000 is enabled for two-way communication, it may incorporate a communication subsystem 1011, including a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the user equipment is intended to operate.

Network access requirements will also vary depending upon the type of network 1019. In some networks, network access is associated with a subscriber or user of the user equipment 1000. A user equipment may require an embedded or a removable user identity module (RUIM) or a subscriber identity module (SIM) card or a UMTS SIM (USIM) in order to operate on a network. The USIM/SIM/RUIM interface 1044 is normally similar to a card-slot into which a USIM/SIM/RUIM card can be inserted and ejected. The USIM/SIM/RUIM card can have memory and hold many key configurations 1051, and other information 1053 such as identification, and subscriber related information. In other cases, rather than a network 1019, user equipment 1000 may communicate with a non-access node, such as a vehicle, roadside infrastructure, another user equipment, or other peer-to-peer communication.

When required network registration or activation procedures have been completed, user equipment 1000 may send and receive communication signals over the network 1019. As illustrated in FIG. 10, network 1019 can include multiple base stations communicating with the mobile device.

Signals received by antenna 1016 through communication network 1019 are input to receiver 1012, which may perform such common receiver functions as signal amplification, frequency down conversion, filtering, channel selection and the like. Analog to digital (A/D) conversion of a received signal allows more complex communication functions such as demodulation and decoding to be performed in the DSP 1010. In a similar manner, signals to be transmitted are processed, including modulation and encoding for example, by DSP 1020 and input to transmitter 1014 for digital to analog (D/A) conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

User equipment 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem or DSRC subsystem, and any other device subsystems generally designated as 1042. Serial port 1030 could include a USB port, On-Board Diagnostics (OBD) port or other port known to those in the art.

Figure 10:
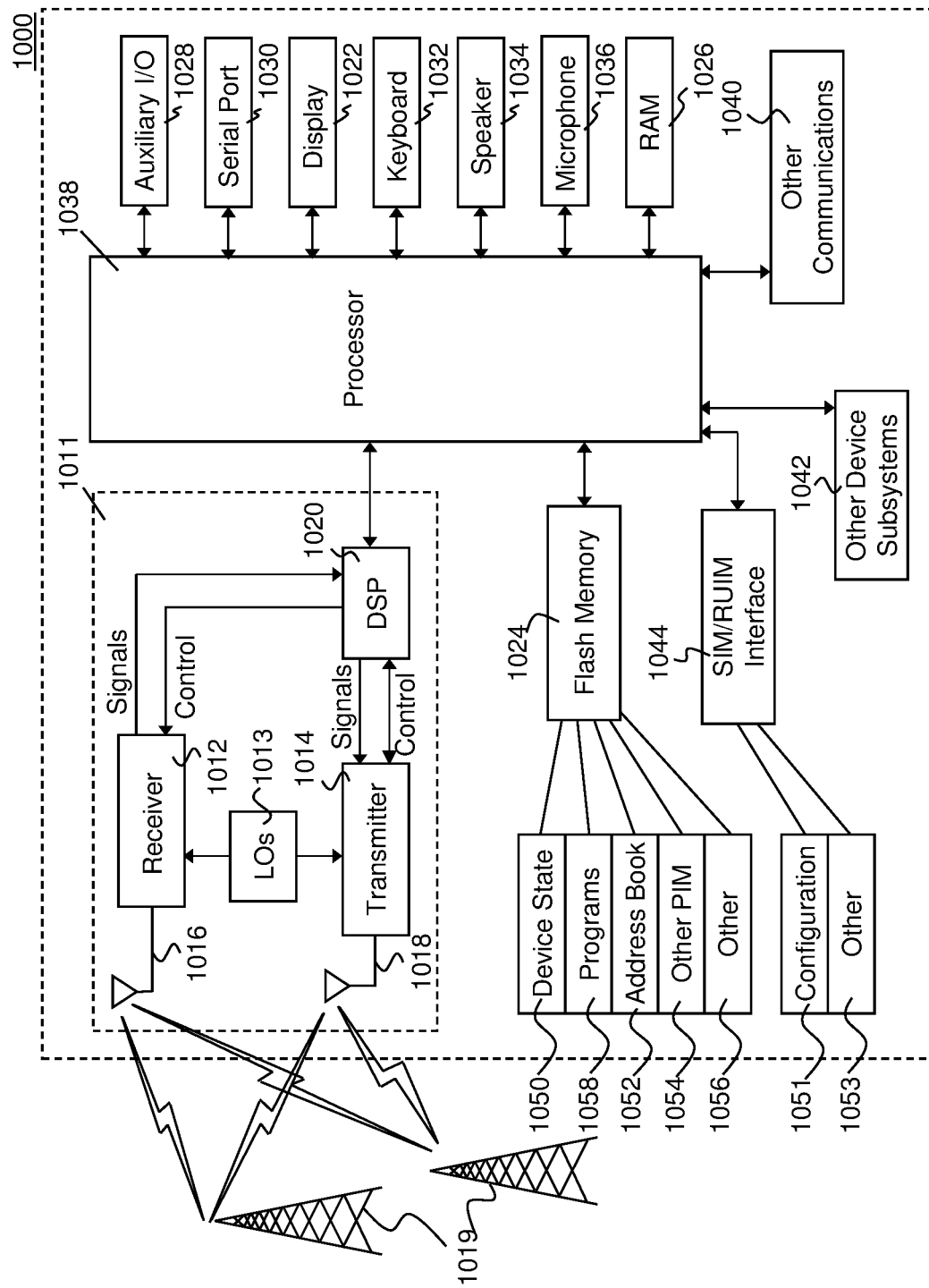
FIG. 10 is a block diagram of a user equipment according to at least one embodiment of the present disclosure.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the user equipment. A predetermined set of applications that control basic operations, including potentially data and voice communication applications for example, will normally be installed on user equipment 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, social media applications, games, among others, may also be loaded onto the user equipment 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of user equipment 1000 may also compose data items such as messages for example, using the keyboard 1032, which may be a complete alphanumeric keyboard or telephone-type keypad, either physical or virtual, among others, in conjunction with the display 1022 and possibly an auxiliary I/O device 1028. Such composed items may then be transmitted over a communication network through the communication subsystem 1011.

Where voice communications are provided, overall operation of user equipment 1000 is similar, except that received signals may typically be output to a speaker 1034 and signals for transmission may be generated by a microphone 1036. Alternative voice or audio I/O subsystems, such as a voice message recording subsystem, may also be implemented on user equipment 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 may be implemented in a user equipment for which synchronization with a user's desktop computer (not shown) may be desirable, but is an optional device component. Such a port 1030 may enable a user to set preferences through an external device or software application and may extend the capabilities of user equipment 1000 by providing for information or software downloads to user equipment 1000 other than through a wireless communication network. As will be appreciated by those skilled in the art, serial port 1030 can further be used to connect the user equipment to a computer to act as a modem or for charging a battery on the user equipment.

Other communications subsystems 1040, such as a short-range communications subsystem, is a further component which may provide for communication between user equipment 1000 and different systems or devices, which need not necessarily be similar devices. For example, the subsystem 1040 may include an infrared device and associated circuits and components or a Bluetooth™ or Bluetooth™ Low Energy communication module to provide for communication with similarly enabled systems and devices. Subsystem 1040 may further include a WUR radio. Subsystem 1040 may further include a DSRC radio. Subsystem 1040 may further include non-cellular communications such as Wi-Fi or WiMAX, or near field communications, and in accordance with the embodiments above such radio may be capable of being split in some circumstances.

The network elements described above can use any computing device or combination of computing devices. One example computing device is shown with regards to FIG. 11. Network element 1110 includes a processor 1120 and a communications subsystem 1130, where the processor 1120 and communications subsystem 1130 cooperate to perform the methods of the embodiments described herein.

Figure 11:
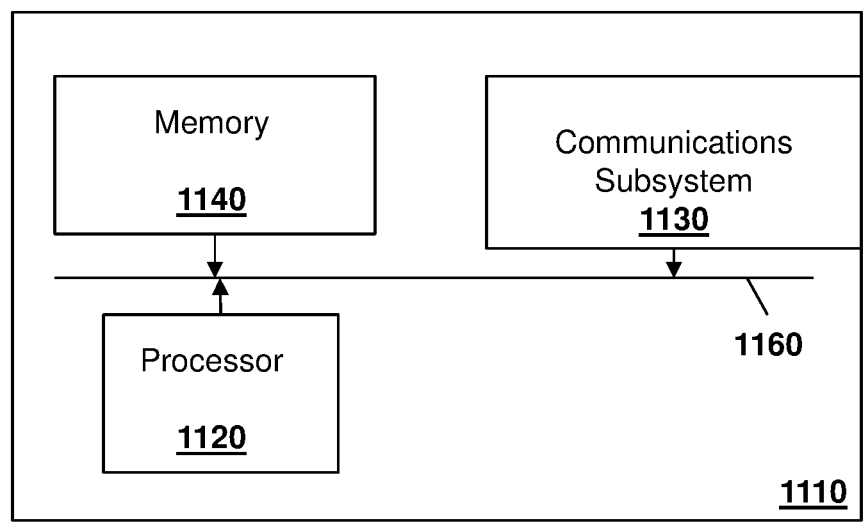
FIG. 11 is a block diagram of a network element according to at least one embodiment of the present disclosure.

Processor 1120 is configured to execute programmable logic, which may be stored, along with data, on network element 1110, and shown in the example of FIG. 11 as memory 1140. Memory 1140 can be any tangible, non-transitory computer readable storage medium, such as optical (e.g., CD, DVD, etc.), magnetic (e.g., tape), flash drive, hard drive, or other memory known in the art.

Alternatively, or in addition to memory 1140, server 1110 may access data or programmable logic from an external storage medium, for example through communications subsystem 1130.

Communications subsystem 1130 allows server 1110 to communicate with other devices or network elements.

Communications between the various elements of server 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

Further aspects of the disclosure are provided in the following clauses.

A. A method for selecting a Public Land Mobile Network (PLMN) at a user equipment (UE), the method comprising: receiving, from a network entity, a list of PLMN identifiers;

attempting to register the UE with a network using at least one PLMN identifier from the list of PLMN identifiers; and if the attempt to register with the network is successful, performing a Session Initiation Protocol (SIP) registration to an Internet Protocol (IP) Multimedia Sub-system (IMS) associated to the PLMN identifier.

B. The method of clause A, further comprising, prior to the receiving: determining that a first trigger condition has been met; and transmitting to the network entity a message, the message comprising at least one of an indication that the first trigger condition has been met and location information for the UE.

C. The method of clause A, wherein the IMS is associated with a Mission Critical (MC) system.

D. The method of clause C, wherein the MC system is a partner MC system, the partner MC system being distinct from a primary MC system of the UE.

E. The method of clause A, wherein the UE is a MC service UE.

F. The method of clause A, further comprising storing on an application of a Universal Integrated Circuit Card (UICC) of the UE the at least one PLMN identifier.

G. The method of clause D, wherein the network entity is a configuration management server.

H. The method of clause G, wherein the configuration management server is in the primary MC system.

I. The method of clause G, wherein the configuration management server is in the partner MC system.

J. The method of clause A, further comprising creating a subset of PLMN identifiers, the subset comprising PLMN identifiers from the list of PLMN identifiers which are available to the user equipment.

K. The method of clause D, wherein the network entity is an identity management server.

L. The method of clause K, where in the identity management server is in the primary MC system.

M. The method of clause K, wherein the identity management server is in the partner MC system.

N. The method of clause J, wherein the attempting to register successively uses each PLMN identifier from the subset until a successful registration.

O. The method of clause B wherein the first trigger condition is at least one of the UE changing PLMN, a timer expiring, a PLMN of the UE becoming unavailable to the UE, and the UE receiving an indication to perform migration to a partner MC system.

P. The method of clause F, further comprising, prior to the storing: determining that a Universal Mobile Telephony System (UMTS) Subscriber Identity Module (USIM) of the UE has at least one field that can be populated with PLMN identifiers.

Q. The method of clause J, further comprising, prior to the creating: determining that a Universal Mobile Telephony System (UMTS) Subscriber Identity Module (USIM) of the UE does not have at least one field that can be populated with PLMN identifiers.

R. The method of clause B, wherein the message further comprises a list of available PLMNs at the UE.

S. The method of clause F, further comprising: prior to the storing, saving a value of at least one field from the UICC application; and determining that a second trigger condition has been met; after the determining, storing in the at least one field the saved value.

T. A user equipment (UE) comprising: a processor; and a communications subsystem; wherein the processor and the communications subsystem cooperate to: receive, from a network entity, a list of PLMN identifiers; attempt to register the UE with a network using at least one PLMN identifier from the list of PLMN identifiers; and if the attempt to register with the network is successful, performing a Session Initiation Protocol (SIP) registration to an Internet Protocol (IP) Multimedia Sub-system (IMS) associated to the PLMN identifier.

U. The UE of clause T, wherein the processor and the communications subsystem further cooperate to, prior to the receiving: determine that a first trigger condition has been met; and transmit to the network entity a message, the message comprising at least one of an indication that the first trigger condition has been met and location information for the UE.

V. The UE of clause T, wherein the IMS is associated with a Mission Critical (MC) system.

W. The UE of clause V, wherein the MC system is a partner MC system, the partner MC system being distinct from a primary MC system of the UE.

X. The UE of clause T, wherein the UE is a MC service UE.

Y. The UE of clause T, wherein the processor and the communications subsystem further cooperate to store on an application of a Universal Integrated Circuit Card (UICC) of the UE the at least one PLMN identifier.

Z. The UE of clause W, wherein the network entity is a configuration management server.

AA. The UE of clause Z, wherein the configuration management server is in the primary MC system.

BB. The UE of clause Z, wherein the configuration management server is in the partner MC system.

CC. The UE of clause T, wherein the processor and the communications subsystem further cooperate to create a subset of PLMN identifiers, the subset comprising PLMN identifiers from the list of PLMN identifiers which are available to the user equipment.

DD. The UE of clause W, wherein the network entity is an identity management server.

EE. The UE of clause DD, where in the identity management server is in the primary MC system.

FF. The UE of clause DD, wherein the identity management server is in the partner MC system.

GG. The UE of clause CC, wherein the attempting to register successively uses each PLMN identifier from the subset until a successful registration.

HH. The UE of clause U, wherein the first trigger condition is at least one of the UE changing PLMN, a timer expiring, a PLMN of the UE becoming unavailable to the UE, and the UE receiving an indication to perform migration to a partner MC system.

II. The UE of clause Y, wherein the processor and the communications subsystem further cooperate to, prior to the storing: determine that a Universal Mobile Telephony System (UMTS) Subscriber Identity Module (USIM) of the UE has at least one field that can be populated with PLMN identifiers.

JJ. The UE of clause CC, wherein the processor and the communications subsystem further cooperate to, prior to the creating: determine that a Universal Mobile Telephony System (UMTS) Subscriber Identity Module (USIM) of the UE does not have at least one field that can be populated with PLMN identifiers.

KK. The UE of clause U, wherein the message further comprises a list of available PLMNs at the UE.

LL. The UE of clause Y, wherein the processor and the communications subsystem further cooperate to: prior to the storing, save a value of at least one field from the UICC application; and determine that a second trigger condition has been met; after the determining, store in the at least one field the saved value.

MM. A non-transitory computer readable medium having stored thereon computer-executable code for execution by a processor of a User Equipment (UE), the code comprising instructions for: receiving, from a network entity, a list of PLMN identifiers; attempting to register the UE with a network using at least one PLMN identifier from the list of PLMN identifiers; and if the attempt to register with the network is successful, performing a Session Initiation Protocol (SIP) registration to an Internet Protocol (IP) Multimedia Sub-system (IMS) associated to the PLMN identifier.

NN. The non-transitory computer readable medium of clause MM, wherein the code further comprises instructions for, prior to the receiving: determining that a first trigger condition has been met; and transmitting to the network entity a message, the message comprising at least one of an indication that the first trigger condition has been met and location information for the UE.

OO. The non-transitory computer readable medium of clause MM, wherein the IMS is associated with a Mission Critical (MC) system.

PP. The non-transitory computer readable medium of clause OO, wherein the MC system is a partner MC system, the partner MC system being distinct from a primary MC system of the UE.

QQ. The non-transitory computer readable medium of clause MM, wherein the UE is a MC service UE.

RR. The non-transitory computer readable medium of clause MM, wherein the code further comprises instructions for storing on an application of a Universal Integrated Circuit Card (UICC) of the UE the at least one PLMN identifier.

SS. The non-transitory computer readable medium of clause PP, wherein the network entity is a configuration management server.

TT. The non-transitory computer readable medium of clause SS, wherein the configuration management server is in the primary MC system.

UU. The non-transitory computer readable medium of clause SS, wherein the configuration management server is in the partner MC system.

VV. The non-transitory computer readable medium of clause MM, wherein the code further comprises instructions for creating a subset of PLMN identifiers, the subset comprising PLMN identifiers from the list of PLMN identifiers which are available to the user equipment.

WW. The non-transitory computer readable medium of clause PP, wherein the network entity is an identity management server.

XX. The non-transitory computer readable medium of clause WW, where in the identity management server is in the primary MC system.

YY. The non-transitory computer readable medium of clause WW, wherein the identity management server is in the partner MC system.

ZZ. The non-transitory computer readable medium of clause VV, wherein the attempting to register successively uses each PLMN identifier from the subset until a successful registration.

AAA. The non-transitory computer readable medium of clause NN wherein the first trigger condition is at least one of the UE changing PLMN, a timer expiring, a PLMN of the UE becoming unavailable to the UE, and the UE receiving an indication to perform migration to a partner MC system.

BBB. The non-transitory computer readable medium of clause RR, wherein the code further comprises instructions for, prior to the storing: determining that a Universal Mobile Telephony System (UMTS) Subscriber Identity Module (USIM) of the UE has at least one field that can be populated with PLMN identifiers.

CCC. The non-transitory computer readable medium of clause VV, wherein the code further comprises instructions for, prior to the creating: determining that a Universal Mobile Telephony System (UMTS) Subscriber Identity Module (USIM) of the UE does not have at least one field that can be populated with PLMN identifiers.

DDD. The non-transitory computer readable medium of clause NN, wherein the message further comprises a list of available PLMNs at the UE.

EEE. The non-transitory computer readable medium of clause SS, wherein the code further comprises instructions for: prior to the storing, saving a value of at least one field from the UICC application; and determining that a second trigger condition has been met; after the determining, storing in the at least one field the saved value.

FFF. A method at a network element comprising: receiving, from a User Equipment (UE), a message comprising at least one of an indication that the UE wishes to migrate to a partner MC system and a location of the UE; determining a list of Public Land Mobile Network (PLMN) identifiers, wherein each PLMN identifier identifies a PLMN associated to the partner MC system; transmitting the list of PLMN identifiers to the UE.

GGG. The method of clause FFF, wherein the message comprises location information for the MC UE.

HHH. The method of clause FFF, wherein the message comprises a list of PLMNs available at the UE.

III. The method of clause FFF, wherein the message comprises an identifier of the partner MC system.

JJJ. The method of clause FFF, wherein the network element is part of a primary MC system for the UE.

KKK. The method of clause JJJ, further comprising sending a request to a server of the partner MC system for allowing the UE access to the partner MC system.

LLL. The method of clause KKK, wherein the request comprises at least one of an MC ID associated to the UE, an identifier of a migration management server of the primary MC system, Session Initiation Protocol (SIP) identities of the primary MC system, and an indication of which PLMNs and which Radio Access Technologies (RATs) are available to the UE.

MMM. The method of clause KKK, further comprising receiving from the server of the partner MC system, the list of PLMN identifiers.

NNN. The method of clause FFF, further comprising determining the partner MC system based on the location information of the MC UE.

OOO. The method of clause FFF, wherein the MC server is part of the partner MC system.

PPP. A method at a User Equipment (UE), comprising: detecting one or more Public Land Mobile Network (PLMN) identifiers for Mission Critical (MC) services; determining a need for PLMN selection to access MC services; storing a first value of a current Registered Public Land Mobile Network (RPLMN) and a second value of a current PLMN selection mode; entering automatic mode of PLMN selection; selecting a PLMN, wherein an identifier of the selected PLMN is from the PLMN identifiers for MC services.

QQQ. The method of clause PPP, wherein the detecting comprises receiving, from a network element, a list of PLMN identifiers for MC services.

RRR. The method of clause PPP, further comprising: attempting to register with a network of the PLMN; subsequent to the attempt to register with the network of the PLMN, performing a Session Initiation Protocol (SIP) registration to an Internet Protocol (IP) Multimedia Subsystem (IMS) using the network of the PLMN.

SSS. The method of clause QQQ, wherein the network element is in a primary MC system for the UE.

TTT. The method of clause QQQ, wherein the network element is in a partner MC system for the UE

APPENDIX A

A.1 Proposed Changes to 3GPP TS 33.180
B2.1 ID Token
B.2.1.1 General

The ID Token shall be a JSON Web Token (JWT) and contain the following standard and MCX token claims. Token claims provide information pertaining to the authentication of the MCX user by the IdM server as well as additional claims. This clause profiles the required standard and MC claims for the MCX Connect profile.

B.2.1.3 PLMN Claims

The PLMN profile extends the OpenID Connect standard claims with the additional claims shown in table B.2.1.3-1.

TABLE B.2.1.3-1

ID token UICC claims

| Parameter | Description |
|---|---|
| PLMN_List | Optional. Contains a list of PLMN identities that should be used by the UE to access the partner MC system:<br>MCC, MNC<br>Optional technology indicator(s) |

B.3.1.3 Token Request

In order to exchange the authorization code for an ID token, access token and refresh token, the MCX client makes a request to the authorization server's token endpoint by sending the following parameters using the "application/x-www-form-urlencoded" format, with a character encoding of UTF-8 in the HTTP request entity-body. Note that client authentication is REQUIRED for native applications (using PKCE) in order to exchange the authorization code for an access token. Assuming that client secrets are used, the client secret is sent in the HTTP Authorization Header. The token request standard parameters are shown in table B.3.1.3-1.

TABLE B.3.1.3-1

Token Request standard required parameters

| Parameter | Values |
|---|---|
| grant_type | REQUIRED. The value shall be set to "authorization_code". |
| code | REQUIRED. The authorization code previously received from the IdM server as a result of the authorization request and subsequent successful authentication of the MCX user. |
| client_id | REQUIRED. The identifier of the client making the API request.<br>It shall match the value that was previously registered with the OAuth Provider during the client registration phase of deployment, or as provisioned via a development portal. |
| redirect_uri | REQUIRED. The value shall be identical to the "redirect_uri" parameter included in the authorization request. |
| code_verifier | REQUIRED. A cryptographically random string that is used to correlate the authorization request to the token request. |
| PLMN_ID | Optional. Shall be set to "yes" if the UE wants to use a partner MC system |
| Location | Can be:<br>Service Provider Identity<br>LA, RA, TA |

An example of a token request for MCX Connect might look like.

Example

POST/as/token.oauth2 HTTP/1.1

Host: IdM.servercom:9031

Cache-Control: no-cache

Content-Type: application/x-www-form-urlencoded grant_type=authorization_code&code=SpIxIOBeZQQYbYS6WxSbIA&client_id=myNativeApp &code_verifier=0x123456789abcdef&redirect_uri=http://3gpp.mcptt/cb&PLMN_ID=Yes&Service_network_of_relay_UE=mcc233 mnc456&Location=41°24'12.2"N 2°10'26.5"E B.3.1.4 Token Response If the access token request is valid and authorized, the IdM server returns an ID token, access token and refresh token to the MCX client; otherwise it will return an error.

An Example of a Successful Response Might Look Like:

Example

HTTP/1.1 200 OK
    Content-Type: application/json;charset=UTF-8
    Cache-Control: no-store
    Pragma: no-cache
    {
"access_token":"eyJhbGciOiJSUzl1NiJ9.eyJtY3B0dF9pZCl6lmFsaWNlQG9yZy5jb20iLCJleH AiOjE0NTM1MDYxMjEslnNjb3Blljpblm9wZW5pZClsljNncHA6bWNwdHQ6cHR0X3NlcnZlciJd LCJjbGllbnRfaWQiOiJtY3B0dF9jbGllbnQifQ.XYlqai4YKSZCKRNMLipGC_5nV4BE79lJpvjex WjlqqcqiEx6AmHHlRo0mhcxeCESrXei9krom9e8Goxr_hgF3szvgbwl8JRbFuv97XgepDLjEq4j L3Cbu41Q9b0WdXAdFmeEbiB8wo_xggiGwv6lDR1b3TgAAsdjkRxSK4ctlKPaOJSRmM7MK McKhlug3BEkSC9-aXBTSlv5fAGN-ShDbPvHycBpjzKWXBvMlR5PaCg-9fwjELXZXdRwz8C6JbRM8aqzhdt4CVhQ3-Arip-S9CKd0tu-qhHfF2rvJDRlg8ZBiihdPH8mJs-qpTFep_1-kON3mL0_g54xVmlMwN0XQA", -continued

```
"refresh_token":"Y7NSzUJuS0Jp7G4SKpBKSOJVHlZxFbxqsqClZhOEk9",
"id_token":"eyJhbGciOiJSUzI1NiJ9.eyJzdWliOilxMjM0NTY3ODkwIiwiYXVkljoibWNwdHRfY2
xpZW50liwiaXNzljoiSWRNUy5zZXJ2ZXIlluY29tOjkwMzEiLCJpYXQiOjE0NTM0OTgxNTgslmV
4cCl6MTQ1MzQ5ODQ1OCwibWNwdHRfaWQiOiJhbGljZUBvcmcuY29tIn0.Dpn7AhiMaqMEg
g12NYUUfJGSFJMPG8M2li9FLtPotDlHvwU2emBws8z5JLw81SXQnoLqZ8ZF8tlhZ1W7uuMb
ufF4Wsr7PAadZixz3CnV2wxFV9qR_VA1-
0ccDTPukUsRHsic0SgZ3albcYKd6VsehFe_GDwfqysYzD7yPwCfPZo",
"token type": "Bearer",
"expires_in": 7199
}
```

The MCX client may now validate the user with the ID token and configure itself for the user (e.g. by extracting the MC service ID from the ID Token). The MCX client then uses the access token to make authorized requests to the MCX resource servers (MCPTT server, MCVideo server, MCData server, KMS, etc.) on behalf of the end user.

ANNEX C (INFORMATIVE)

Figure 12A:
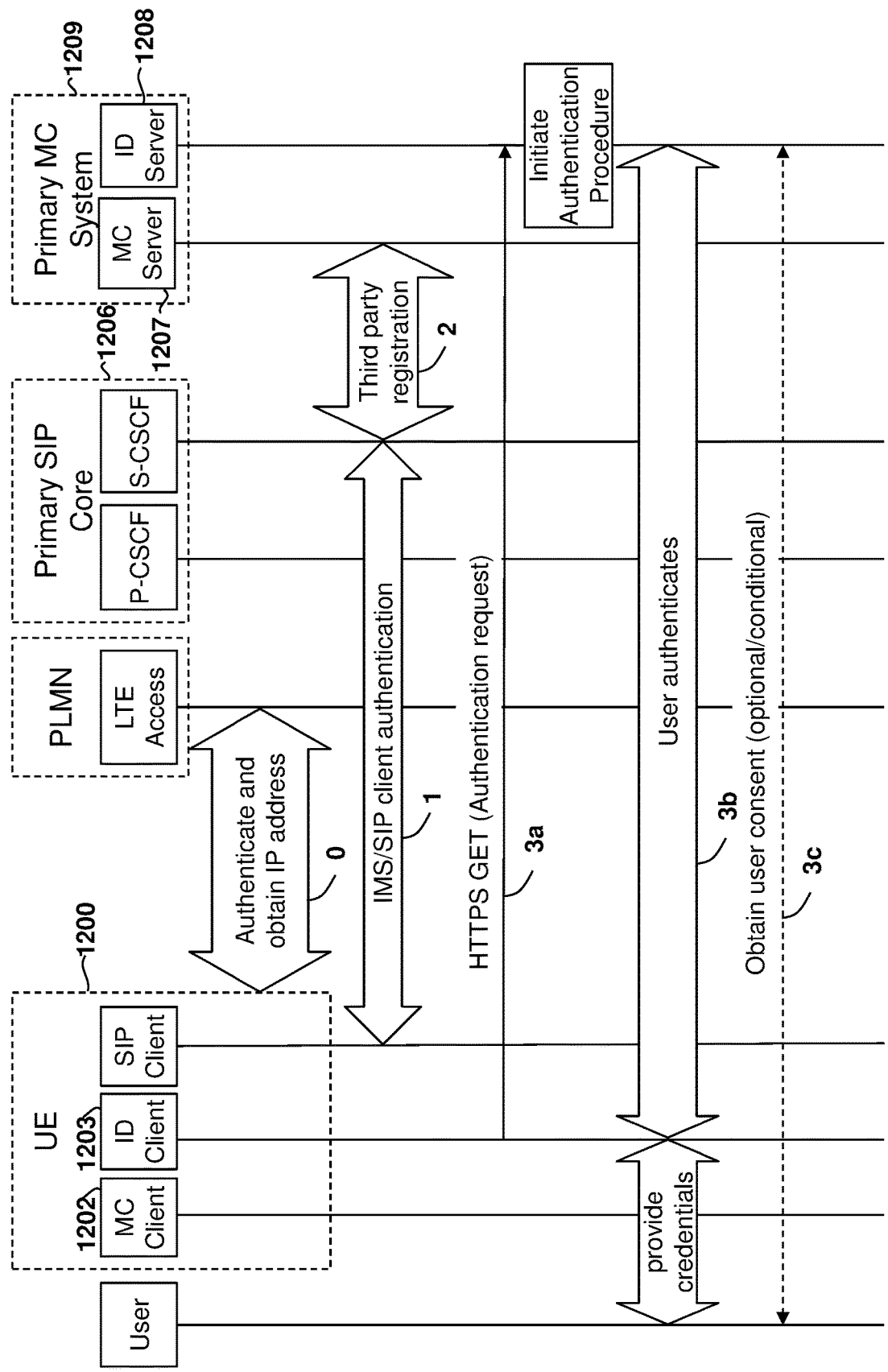
FIG. 12A is a message flow diagram of a method according to at least one embodiment of the present disclosure.
Figure 12B:
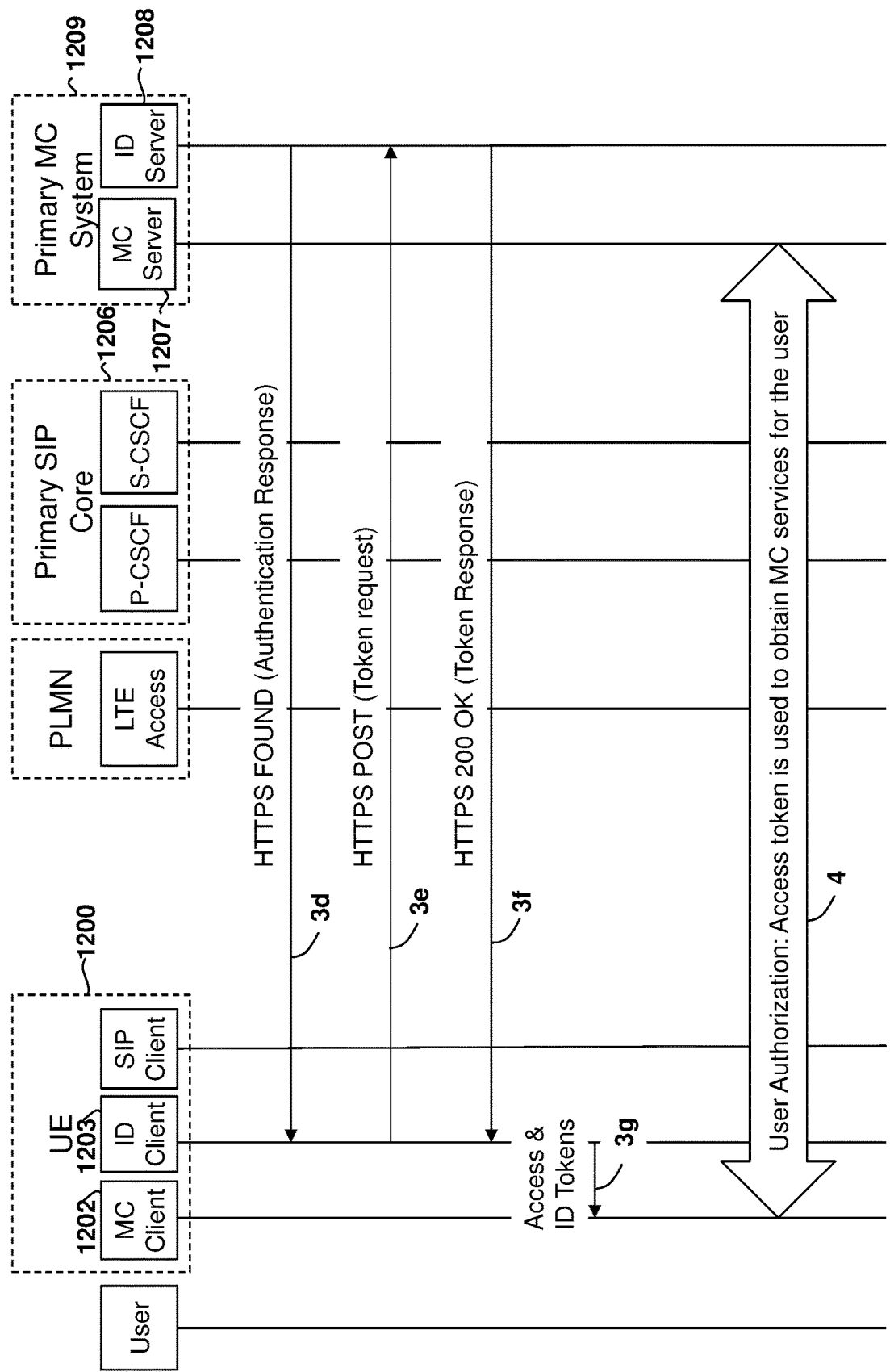
FIG. 12B is a message flow diagram of a method according to at least one embodiment of the present disclosure.

OpenID Connect Detailed Flow
C.1 Detailed Flow for MC User Authentication and Registration Using OpenID Connect
FIGS. 12A and 12B show the detailed flow for MC User Authentication and Registration using the OpenID Connect messages as described in annex B.
   Step 0: The UE 1200 attaches to the network, establishes normal connectivity, and sets up network security as defined in 3GPP TS 33.401 [14]. Local P-CSCF in the Home IMS network is discovered at this point.
   Step 1: The UE IMS/SIP Client 1203 authenticates with the primary IMS/SIP core 1206. For IMS authentication, 3GPP TS 33.203 [9] applies.
   Step 2: The IMS/SIP core 1206 sends a SIP 3rd Party Registration to the MCX application Server(s) 1207, notifying them of the MC UE SIP registration. The 3$^{rd}$ party REGISTER message includes the registered IMPU and S-CSCF's SIP-URI or IP Address.
   Step 3a: The IdM client 1203 in the UE issues a HTTPS Authentication request to the OIDC based IdM Server 1208 in the MC network 1209. The client includes the code_challenge value in this request.
   Step 3b: The MC User Identity and associated credentials are provided to the IdM server 1208. The credentials are successfully authenticated (and optionally authorized) by the IdM Server 1208.
      a) As part of Step 3a, 3b or 3e the UE includes the following information in the message sent to the IdM server:
      b) Location of the MC UE.
      c) PLMN identity is required to access partner MC system
   Step 3c: The IdM Server 1208 may optionally request user consent for granting the MCX client 1202 access to the MCX service in the MCX Server.
   Step 3d: The IdM Server 1208 generates an authorization code that is associated with the code_challenge provided by the client. It sends a browser redirect HTTP message with the Authorization Response containing the authorization code.
   Step 3e: The UE IdM Client 1203 performs a HTTP POST request to exchange the authorization code for an access token. In the request, the client includes the code-verifier string. This string is cryptographically associated with the code_challenge value provided in the Authorization Request in Step 3a.
   Step 3f: The IdM Server 1208 verifies the IdM Client 1203 based on the received code-verifier string and issues a 200 OK with an access token and ID token (specific to the MC user and MCX service(s)) included in it. The ID token contains the JSON Web Token claim containing at least one of a PLMN identity that should be used to access a partner MC system.
      NOTE: The server verifies by calculating the code challenge from the received code_verifier and comparing it with the code_challenge value provided by the client in Step 3a.
   Step 3g: The access token and ID token are made available to the MCX client(s) 1202.
   Step 4: The MC UE 1200 performs user service authorization.

APPENDIX B

Proposed Changes to 3GPP TS 23.122
3.1D PLMN Selection Triggered by MC Migration
   If the MS supports one or more Mission Critical services and needs to perform PLMN selection for MC migration to a partner MC system, then the MS shall proceed as follows:
      i) the MS shall store a duplicate value of the RPLMN and a duplicate of the PLMN selection mode that were in use before PLMN selection due to MC migration to a partner MC system was initiated, unless this PLMN selection due to MC migration to a partner MC system follows another PLMN selection due to MC migration to a partner MC system or a manual CSG selection as specified in subclause 4.4.3.1.3.3;
      ii) the MS shall enter into Automatic mode of PLMN selection as specified in subclause 4.4 taking into account the additional requirements in items iii) to x) below;
      iii) Among the PLMNs advertised by the E-UTRA cell operating in the radio resources provisioned to the MS for MC migration as specified in 3GPP TS 2x.MC-stage3 [xx] or 3GPP TS 31.102 [40], the MS shall choose one allowable PLMN which:
         1) provides radio resources for MC migration to the required partner MC system;
         2) is in the list of authorised PLMNs for MC migration to the partner MC system as specified in 3GPP TS 2x.MCstage3 [xx]; and
         3) is not in the list of "PLMNs with E-UTRAN not allowed" as specified in subclause 3.1;
         if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action;

iv) if the registration fails due to "PLMN not allowed" or "EPS services not allowed", then the MS shall update the appropriate list of forbidden PLMNs as specified in subclause 3.1, and shall either:
  A) return to the stored duplicate PLMN selection mode and use the stored duplicate value of RPLMN for further action; or
  B) perform the action described in iii) again with the choice of PLMNs further excluding the PLMNs on which the MS has failed to register.
  Whether the MS performs A) or B) above is left up to MS implementation.
v) if the registration fails due to causes other than "PLMN not allowed" or "EPS services not allowed", the MS shall:
  if the handling of the failure requires updating a list of forbidden PLMNs, update the appropriate list (as specified in 3GPP TS 24.301 [23A]); and
  if the handling of the failure does not require updating a list of forbidden PLMNs (as specified in 3GPP TS 24.301 [23A]), remember the PLMN as a PLMN on which the MS has failed to register;
  NOTE 1: How long the MS memorizes the PLMNs on which it has failed to register is implementation dependent.
  and the MS shall either:
  A1) return to the stored duplicate PLMN selection mode and use the stored duplicate value of RPLMN for further action; or
  B1) perform the action described in iii) again with the choice of PLMNs further excluding the PLMNs on which the MS has failed to register;
  Whether the MS performs A1) or B1) above is left up to MS implementation.
vi) if the MS is no longer in the coverage of the selected PLMN, then the MS shall return to the stored duplicate PLMN selection mode and use the stored duplicate value of RPLMN for further action.
vii) if the MS is unable to find a suitable cell on the selected PLMN, then the MS shall return to the stored duplicate PLMN selection mode and use the stored duplicate value of RPLMN for further action.
viii) if the MS is switched off while on the selected PLMN and switched on again, the MS shall use the stored duplicate value of RPLMN as RPLMN and behave as specified in subclause 4.4.3.1;
ix) if the user initiates a PLMN selection while on the selected cell, the MS shall delete the stored duplicate value of PLMN selection mode, use the stored duplicate value of RPLMN as RPLMN and follow the procedures (as specified for switch-on or recovery from lack of coverage) in subclause 4.4.3.1. The MS shall delete the stored duplicate value of RPLMN once the MS has successfully registered to the selected PLMN; and
x) if the MS no longer needs to perform MC migration to a partner MC system, the MS shall return to the stored duplicate PLMN selection mode and use the stored duplicate value of RPLMN for further action.
NOTE 2: If the MS returns to the RPLMN due to a failure to register in the selected PLMN, the upper layers of the MS can trigger PLMN selection again to initiate MC migration to a partner MC system.
If the PLMN selected for MC migration to a partner MC system is a VPLMN, the MS shall not periodically scan for higher priority PLMNs during the duration of MC migration to a partner MC system.

The solution to prevent potential ping-pong between the RPLMN and the PLMN selected for MC migration to a partner MC system is MS implementation specific.

APPENDIX C

A.3 Proposed Changes to 3GPP TS 24.379
A.3.1 Alternative 1
7 Registration and Service Authorisation
7.1 General This clause describes the procedures for SIP registration and MCPTT service authorization for the MCPTT client and the MCPTT service. The MCPTT UE can use SIP REGISTER or SIP PUBLISH for MCPTT service settings to perform service authorization for MCPTT. The decision which method to use is based on implementation and on availability of an access-token received as outcome of the user authentication procedure as described in 3GPP TS 24.482 [49]. Prior to performing the procedures for SIP registration and MCPTT service authorization for the MCPTT client and the MCPTT service, if the UE intends to use a preferred PLMN, the UE performs PLMN selection triggered by mission critical registration and service authorization, as specified in 3GPP TS 23.122 [9].

If another MC service client (e.g. MCVideo, MCData) is operating at the same time on the same MC UE as the MCPTT client, then the MCPTT client shares the same SIP registration as the other MC service clients. The SIP REGISTER procedures in this clause are combined with the SIP REGISTER procedures for the other operating MC service clients to create a single SIP REGISTER request. If other MC service clients are already operating when the MCPTT client registers, then a re-registration is performed containing the parameters for the other operating MC services.

Although the access-token can be the same for the MCPTT service as for other MC services when performing service authorization for MCPTT along with other MC services using SIP REGISTER multipart MIME bodies for each MC service are included in the SIP REGISTER request. The MCPTT server can therefore receive multipart MIME bodies in the SIP REGISTER request. Multiple contact addresses (one per MC service client) can be included in a SIP REGISTER request provided they all contain the same IP address and port number (see 3GPP TS 24.229 [4] for further details of including multiple contact addresses in a single SIP REGISTER request).

If the MCPTT client logs off from the MCPTT service but other MC service clients are to remain registered the MC UE performs a re-registration as specified in 3GPP TS 24.229 [4] without the g.3gpp.mcptt media feature tag and the g.3gpp.icsi-ref media feature tag containing the value of "urn:urn-7:3gpp-service.ims.icsi.mcptt" in the Contact header field of the SIP REGISTER request but with the parameters for the remaining operating MC service clients.

The UE intending to use a preferred PLMN can further comprise checking if the UE has a list with at least one PLMN preferred for mission critical services. The intending to use a preferred PLMN can further comprise receiving a report from the lower layers of the UE that one or more PLMNs operating using the radio resources are available, and checking if one or more of the one or more PLMNs operating using the radio resources match with a PLMN on the list with the at least one preferred PLMN. A PLMN operating using the radio resources can further comprise a PLMN available via a cell. The UE intending to use a preferred PLMN can further comprise receiving an indication that the user desires to use a preferred PLMN.

A.3.2 Alternative 2
7 Registration and Service Authorisation
7.1 General

This clause describes the procedures for SIP registration and MCPTT service authorization for the MCPTT client and the MCPTT service. The MCPTT UE can use SIP REGISTER or SIP PUBLISH for MCPTT service settings to perform service authorization for MCPTT. The decision which method to use is based on implementation and on availability of an access-token received as outcome of the user authentication procedure as described in 3GPP TS 24.482 [49]. Prior to performing the procedures for SIP registration and MCPTT service authorization for the MCPTT client and the MCPTT service, if the UE intends to migrate to a partner MC system, the UE performs PLMN selection triggered MC migration to a partner MC system, as specified in 3GPP TS 23.122 [9].

If another MC service client (e.g. MCVideo, MCData) is operating at the same time on the same MC UE as the MCPTT client, then the MCPTT client shares the same SIP registration as the other MC service clients. The SIP REGISTER procedures in this clause are combined with the SIP REGISTER procedures for the other operating MC service clients to create a single SIP REGISTER request. If other MC service clients are already operating when the MCPTT client registers, then a re-registration is performed containing the parameters for the other operating MC services.

Although the access-token can be the same for the MCPTT service as for other MC services when performing service authorization for MCPTT along with other MC services using SIP REGISTER multipart MIME bodies for each MC service are included in the SIP REGISTER request. The MCPTT server can therefore receive multipart MIME bodies in the SIP REGISTER request. Multiple contact addresses (one per MC service client) can be included in a SIP REGISTER request provided they all contain the same IP address and port number (see 3GPP TS 24.229 [4] for further details of including multiple contact addresses in a single SIP REGISTER request).

If the MCPTT client logs off from the MCPTT service but other MC service clients are to remain registered the MC UE performs a re-registration as specified in 3GPP TS 24.229 [4] without the g.3gpp.mcptt media feature tag and the g.3gpp.icsi-ref media feature tag containing the value of "urn:urn-7:3gpp-service.ims.icsi.mcptt" in the Contact header field of the SIP REGISTER request but with the parameters for the remaining operating MC service clients.

The UE intending to migrate to a partner MC system can further comprise checking if the UE has a list with at least one PLMN enabling access to the partner MC system. The intending to migrate to a partner MC system can further comprise receiving a report from the lower layers of the UE that one or more PLMNs operating using the radio resources are available, and checking if one or more of the one or more PLMNs operating using the radio resources match with a PLMN on the list with at least one PLMN enabling access to the partner MC system. A PLMN operating using the radio resources can further comprise a PLMN available via a cell. The UE intending to migrate to a partner MC system can further comprise receiving an indication that the user desires to migrate to a partner MC system.

The invention claimed is:

1. A non-transitory computer readable medium having stored thereon computer-executable code for execution by a processor of a user equipment (UE) configured for selecting a Public Land Mobile Network (PLMN), the instruction code when executed causing the UE to:
   determine that a first trigger condition has been met;
   transmit to a network entity a message, the message comprising an indication that the first trigger condition has been met;
   receive, from the network entity, a list of PLMN identifiers, wherein each PLMN identifier in the list of PLMN identifiers corresponds to a PLMN that allows the UE to migrate to a new Mission Critical (MC) system;
   attempt to register the UE with a network using at least one PLMN identifier from the list of PLMN identifiers; and
   when the attempt to register with the network is successful, perform a Session Initiation Protocol (SIP) registration to an Internet Protocol (IP) Multimedia Subsystem (IMS) associated to the PLMN identifier;
   wherein the first trigger condition is the UE receiving an indication to perform migration to a partner MC system, the partner MC system being associated to the IMS.

2. The non-transitory computer readable medium of claim 1, wherein the IMS is associated with a Mission Critical (MC) system.

3. The non-transitory computer readable medium of claim 2, wherein the MC system is a partner MC system, the partner MC system being distinct from a primary MC system of the UE.

4. The non-transitory computer readable medium of claim 1, wherein the instruction code is further configured to cause the UE to store on an application of a Universal Integrated Circuit Card (UICC) of the UE the at least one PLMN identifier.

5. The non-transitory computer readable medium of claim 1, wherein the instruction code is further configured to cause the UE to create a subset of PLMN identifiers, the subset comprising PLMN identifiers from the list of PLMN identifiers which are available to the user equipment.

6. The non-transitory computer readable medium of claim 5, wherein the instruction code is configured to cause the UE to attempt to register by successively using each PLMN identifier from the subset until a successful registration.

7. The non-transitory computer readable medium of claim 4, wherein the instruction code is further configured to, prior to the storing, cause the UE to:
   determine that a Universal Mobile Telephony System (UMTS) Subscriber Identity Module (USIM) of the UE has at least one field that can be populated with PLMN identifiers.

8. The non-transitory computer readable medium of claim 5, wherein the instruction code is further configured to, prior to the creating, cause the UE to:
   determine that a Universal Mobile Telephony System (UMTS) Subscriber Identity Module (USIM) of the UE does not have at least one field that can be populated with PLMN identifiers.

* * * * *